(12) United States Patent
Nakanishi et al.

(10) Patent No.: US 10,705,637 B2
(45) Date of Patent: *Jul. 7, 2020

(54) DETECTION DEVICE AND DISPLAY DEVICE

(71) Applicant: Japan Display Inc., Tokyo (JP)

(72) Inventors: Takayuki Nakanishi, Tokyo (JP); Naoki Takada, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/139,582

(22) Filed: Sep. 24, 2018

(65) Prior Publication Data

US 2019/0102019 A1    Apr. 4, 2019

(30) Foreign Application Priority Data

Sep. 29, 2017    (JP) .................................. 2017-192033

(51) Int. Cl.
  *G06F 3/041*    (2006.01)
  *G02F 1/1333*   (2006.01)
  *G06F 3/044*    (2006.01)

(52) U.S. Cl.
  CPC ........ *G06F 3/0412* (2013.01); *G02F 1/13338* (2013.01); *G06F 3/044* (2013.01); *G06F 3/0416* (2013.01); *G06F 3/0445* (2019.05); *G06F 3/0448* (2019.05); *G06F 3/041662* (2019.05); *G06F 2203/04107* (2013.01)

(58) Field of Classification Search
  CPC .. G02F 1/13338; G06F 3/0412; G06F 3/0416; G06F 3/041662; G06F 3/044; G06F 3/0445; G06F 3/0448; G06F 2203/04107
  See application file for complete search history.

(56) References Cited

U.S. PATENT DOCUMENTS

| | | | |
|---|---|---|---|
| 2010/0182273 A1 | 7/2010 | Noguchi et al. | |
| 2014/0028616 A1* | 1/2014 | Furutani | G06F 3/044 345/174 |
| 2015/0268765 A1* | 9/2015 | Nakayama | G06F 3/0412 345/174 |
| 2018/0095559 A1* | 4/2018 | Yamazaki | G06F 3/044 |
| 2018/0307367 A1 | 10/2018 | Noguchi et al. | |

FOREIGN PATENT DOCUMENTS

JP    2009-244958 A    10/2009

* cited by examiner

*Primary Examiner* — Nelson M Rosario
(74) *Attorney, Agent, or Firm* — K&L Gates LLP

(57) ABSTRACT

According to an aspect, a detection device includes: at least one substrate; a plurality of first electrodes extending in a first direction of the substrate and arrayed in a second direction intersecting the first direction; and a plurality of second electrodes arrayed in at least the first direction in a layer different from a layer of the first electrodes. Each of the second electrodes partially overlaps with the first electrodes in planar view and has an electric-field transmission region, in which an electric field can pass through each of the second electrodes in a direction perpendicular to the substrate. The electric-field transmission region in each of the second electrodes overlaps with one of the first electrodes in planar view.

7 Claims, 30 Drawing Sheets

DETECTION DEVICE AND DISPLAY DEVICE

CROSS-REFERENCE TO RELATED APPLICATIONS

This application claims priority from Japanese Application No. 2017-192033, filed on Sep. 29, 2017, the contents of which are incorporated by reference herein in its entirety.

BACKGROUND

1. Technical Field

The present disclosure relates to a detection device and a display device.

2. Description of the Related Art

Touch detection devices capable of detecting an external proximity object, or so-called touch panels, have recently been attracting attention. Japanese Patent Application Laid-open Publication No. 2009-244958 discloses that a touch panel is mounted on or integrated with a display device, such as a liquid crystal display device, and used as a display device with a touch detection function. Various functions of such display devices are known, including a touch detection function to detect contact of an operator's finger with a screen and a hover detection (proximity detection) function to detect a proximity state, a gesture, or the like of the finger not in contact with the screen.

Touch detection and hover detection are significantly different in a distance between detection electrodes and a detected target object serving as a detection target, such as a finger, and in the sensitivity required for the detection. If electrodes and a drive configuration for touch detection are used for hover detection without any change, desirable hover detection may be difficult. Increasing the area of the detection electrodes is an effective way to increase detection sensitivity in hover detection. In this case, however, detection accuracy in touch detection may decrease.

SUMMARY

According to an aspect, a detection device includes: at least one substrate; a plurality of first electrodes extending in a first direction of the substrate and arrayed in a second direction intersecting the first direction; and a plurality of second electrodes arrayed in at least the first direction in a layer different from a layer of the first electrodes. Each of the second electrodes partially overlaps with the first electrodes in planar view and has an electric-field transmission region, in which an electric field can pass through each of the second electrodes in a direction perpendicular to the substrate. The electric-field transmission region in each of the second electrodes overlaps with one of the first electrodes in planar view.

According to another aspect, a display device includes: a display panel including a detection device; and a display region. The second electrodes are provided in a region overlapping with the display region. The detection device includes: at least one substrate; a plurality of first electrodes extending in a first direction of the substrate and are arrayed in a second direction intersecting the first direction; a plurality of second electrodes arrayed in at least the first direction in a layer different from a layer of the first electrodes. Each of the second electrodes partially overlaps with the first electrodes in planar view and has an electric-field transmission region, in which an electric field can pass through each of the second electrodes in a direction perpendicular to the substrate. The electric-field transmission region in each of the second electrodes overlaps with one of the first electrodes in planar view.

DETAILED DESCRIPTION

Figure 1:
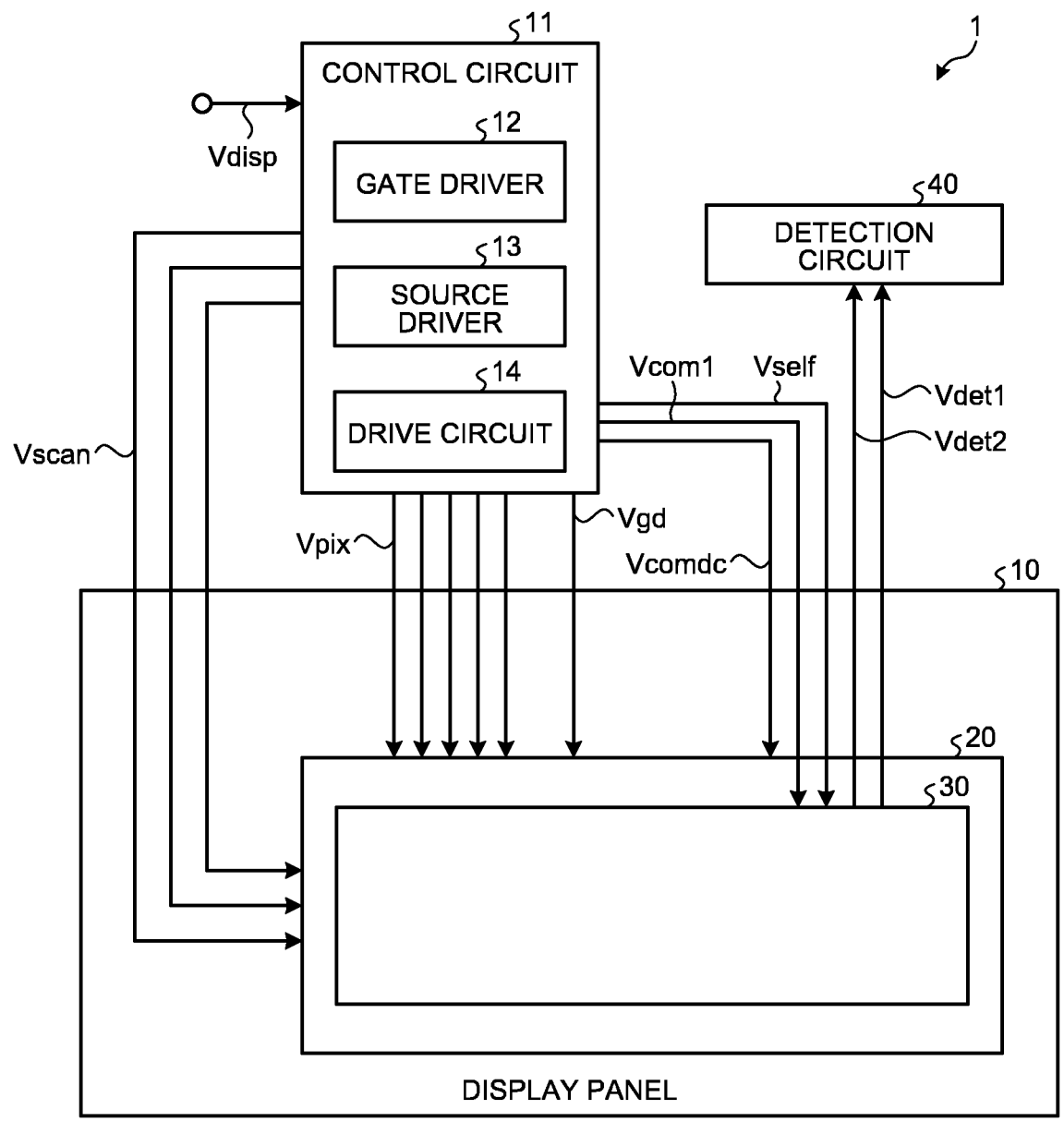
FIG. 1 is a block diagram illustrating an exemplary configuration of a detection device and a display device according to a first embodiment of the present disclosure.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present disclosure and the figures, components similar to those previously described with reference to previous figures are denoted by like reference numerals, and detailed explanation thereof may be appropriately omitted. In this disclosure, when an element A is described as being "on" another element B, the element A can be directly on the other element B, or there can be one or more elements between the element A and the other element B.

First Embodiment

Figure 2:
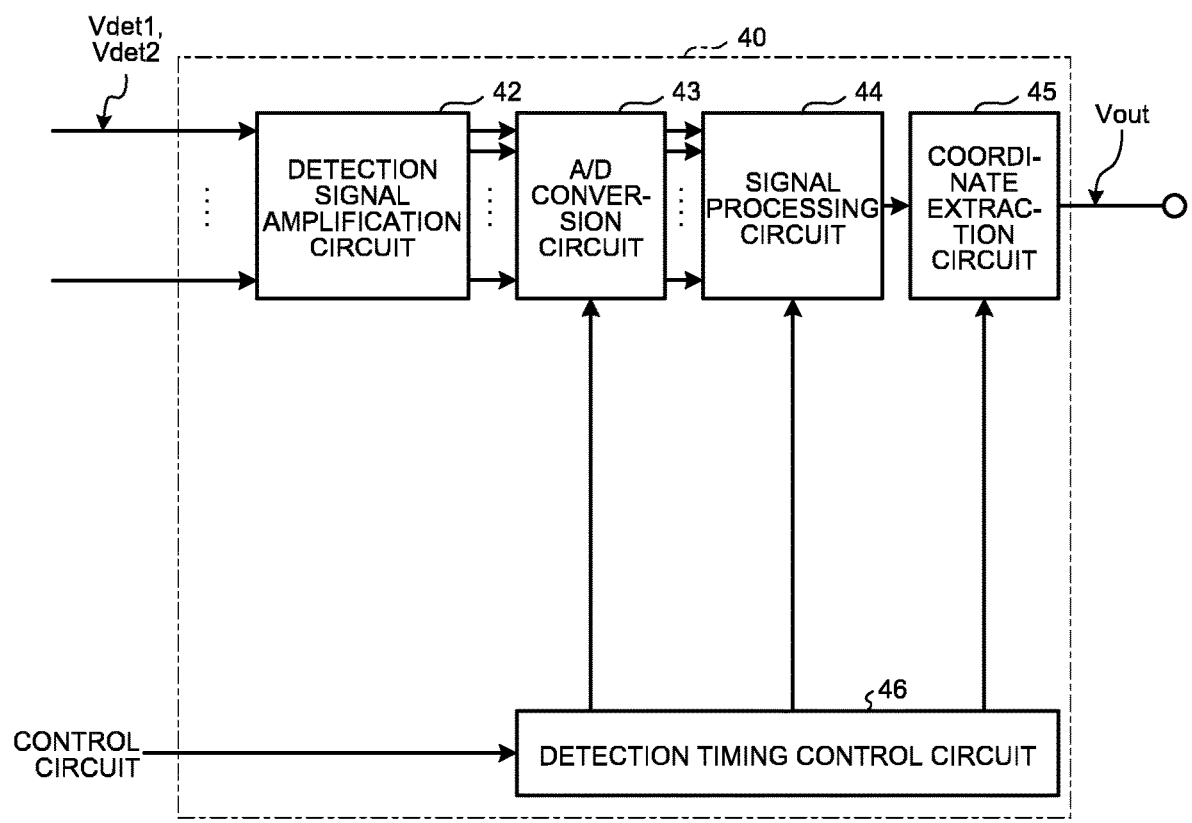
FIG. 2 is a block diagram illustrating an exemplary configuration of a detection circuit.

FIG. 1 is a block diagram illustrating an exemplary configuration of a detection device and a display device according to a first embodiment of the present disclosure. FIG. 2 is a block diagram illustrating an exemplary configuration of a detection circuit. As illustrated in FIG. 1, a display device 1 includes a display panel 10, a control circuit 11, and a detection circuit 40. The display panel 10 includes a display region 20 and a detection device in a sensor region 30. The display region 20 displays an image. The sensor region 30 is included in the detection device that detects touch input. The block diagrams in FIGS. 1 and 2 conceptually explain the configuration, and the detection device and the display device may have another configuration.

The display panel 10 is a display device in which the display region 20 and the sensor region 30 are integrated with each other. Specifically, in the display panel 10, part of elements, such as electrodes and substrates, of the display region 20 are also used as electrodes and substrates of the sensor region 30.

The display region 20 includes a liquid crystal display element serving as a display element. The display region 20 includes a plurality of pixels each having the display element and has a display surface facing the pixels. The display region 20 receives video signals to display an image composed of the pixels on the display surface. The display region 20 may be an organic electroluminescence (EL) display panel, for example.

The control circuit 11 includes a gate driver 12, a source driver 13, and a drive circuit 14. The control circuit 11 supplies control signals to the gate driver 12, the source driver 13, the drive circuit 14, and the detection circuit 40, in accordance with video signals Vdisp supplied from the outside, thereby controlling a display operation and a detection operation.

The gate driver 12 supplies scanning signals Vscan to one horizontal line to be a target of display drive in the display panel 10, in accordance with the control signals supplied from the control circuit 11. Accordingly, one horizontal line to be a target of display drive is sequentially or simultaneously selected.

The source driver 13 is a circuit that supplies pixel signals Vpix to respective sub-pixels SPix (refer to FIG. 14) in the display region 20. Part of the functions of the source driver 13 may be provided to the display panel 10. In this case, the control circuit 11 may generate the pixel signals Vpix and supply them to the source driver 13.

The drive circuit 14 supplies drive signals Vcomdc for display to first electrodes COML of the display panel 10. The drive circuit 14 supplies first drive signals Vcom1 for detection to the first electrodes COML of the display panel 10 or supplies second drive signals Vself to second electrodes TDL.

The control circuit 11 according to the present embodiment time-divisionally performs, a display mode for performing display in the display region 20 and a detection mode for detecting a target object in the sensor region 30. The control circuit 11 has two detection modes, that is, a touch detection mode (first detection mode) and a hover detection mode (second detection mode). In the present disclosure, touch detection is referred to as detection of the position of the target object in a state where the target object is in contact with a detection surface or the display surface or proximate enough to the detection surface or the display surface so as to be equated with being in contact therewith (hereinafter, referred to as a "contact state"). Hover detection is referred to as detection of the position and a movement of the target object in a state where the target object is not in contact with the detection surface or the display surface or not proximate enough to the detection surface or the display surface so as be equated with being in contact therewith (hereinafter, referred to as a "non-contact state"). A state where no target object is present at a position facing the detection surface or the display surface or a state where the target object is too far away from the display surface to be detected in hover detection is referred to as a "non-present state".

In the sensor region 30, the detection device performs touch detection based on the basic principle of touch detection by a mutual capacitance method (also referred to as a mutual method). If the detection device detects the target object in the contact state in the sensor region 30, the detection device outputs first detection signals Vdet1 to the detection circuit 40. In the sensor region 30, the detection device performs hover detection based on the basic principle of touch detection by a self-capacitance method (also referred to as a self-method). If the detection device detects the target object in the non-contact state in the sensor region 30, the detection device outputs second detection signals Vdet2 to the detection circuit 40.

In mutual capacitance detection, the detection circuit 40 determines whether a touch is made by the target object on the display surface of the display panel 10, in accordance with the control signals supplied from the control circuit 11 and the first detection signals Vdet1 output from the display panel 10. If a touch is detected, the detection circuit 40 calculates the coordinates at which the touch input is performed, for example. In self-capacitance hover detection, the detection circuit 40 can detect the position and a movement, such as a gesture, of the target object in the non-contact state, in accordance with the control signals supplied from the control circuit 11 and the second detection signals Vdet2 output from the display panel 10.

As illustrated in FIG. 2, the detection circuit 40 includes a detection signal amplification circuit 42, an analog/digital (A/D) conversion circuit 43, a signal processing circuit 44, a coordinate extraction circuit 45, and a detection timing control circuit 46. The detection timing control circuit 46 controls the A/D conversion circuit 43, the signal processing circuit 44, and the coordinate extraction circuit 45 to operate in synchronization with one another, in accordance with the control signals supplied from the control circuit 11.

In touch detection, the detection signal amplification circuit 42 amplifies the first detection signals Vdet1 supplied from the display panel 10. The A/D conversion circuit 43 samples analog signals output from the detection signal amplification circuit 42 at a timing synchronized with the first drive signals Vcom1, thereby converting the analog signals into digital signals.

The signal processing circuit 44 is a logic circuit that determines whether a touch is made on the display panel 10 in accordance with the output signals from the A/D conversion circuit 43. The signal processing circuit 44 performs processing of extracting a signal (absolute value $|\Delta V|$) of a difference between the detection signals caused by a finger. The signal processing circuit 44 compares the absolute value $|\Delta V|$ with a predetermined threshold voltage. If the absolute value $|\Delta V|$ is lower than the threshold voltage, the signal processing circuit 44 determines that the target object is in the non-present state. By contrast, if the absolute value $|\Delta V|$ is equal to or higher than the threshold voltage, the signal processing circuit 44 determines that the target object is in the contact or proximity state (contact state). The detection circuit 40 thus can perform touch detection.

The coordinate extraction circuit 45 is a logic circuit that calculates, if the signal processing circuit 44 detects a touch, the touch panel coordinates of the detection position. The coordinate extraction circuit 45 outputs the touch panel coordinates as output signals Vout. The coordinate extraction circuit 45 may output the output signals Vout to the control circuit 11. The control circuit 11 can perform a predetermined display or a detection operation in accordance with the output signals Vout.

In hover detection, the detection circuit 40 performs the same processing as that described above, in accordance with the second detection signals Vdet2 supplied from the display panel 10. If the signal processing circuit 44 detects the target object in the non-contact state, the coordinate extraction circuit 45 calculates the coordinates of the target object. The detection circuit 40 thus can detect the position and a movement, such as a gesture, of the target object in the non-contact state.

The detection signal amplification circuit 42, the A/D conversion circuit 43, the signal processing circuit 44, the coordinate extraction circuit 45, and the detection timing control circuit 46 of the detection circuit 40 are provided to the display device 1. The configuration is not limited thereto, and all or part of the functions of the detection circuit 40 may be provided to an external processor, for example. The coordinate extraction circuit 45, for example, may be provided to an external processor different from the display device 1. In this case, the detection circuit 40 may output the signals processed by the signal processing circuit 44 as the output signals Vout.

Figure 3:
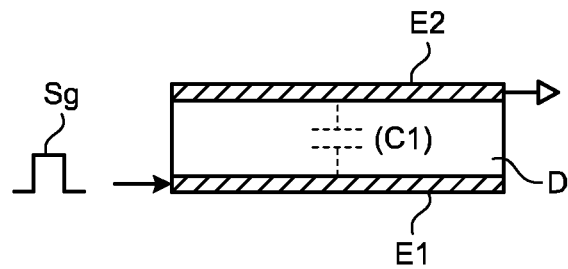
FIG. 3 is a diagram illustrating a non-present state for explaining the basic principle of mutual capacitance detection.
Figure 4:
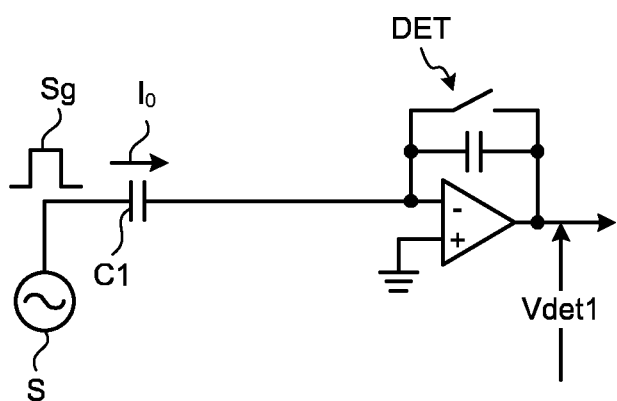
FIG. 4 is an explanatory diagram illustrating an example of an equivalent circuit in mutual capacitance detection in the non-present state.
Figure 5:
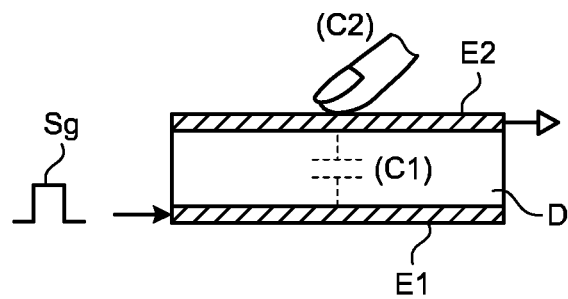
FIG. 5 is a diagram illustrating a contact state for explaining the basic principle of mutual capacitance detection.
Figure 6:
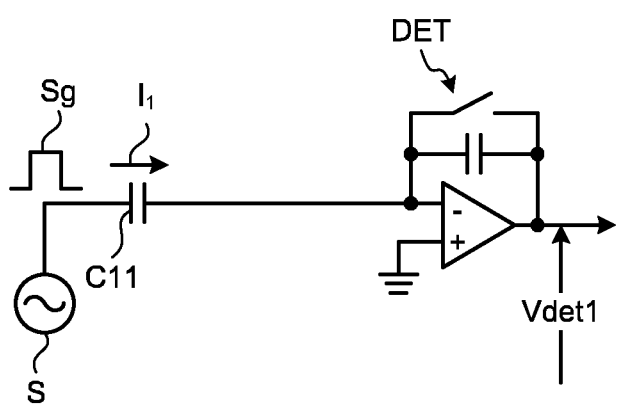
FIG. 6 is an explanatory diagram illustrating an example of an equivalent circuit in mutual capacitance detection in the contact state.
Figure 7:
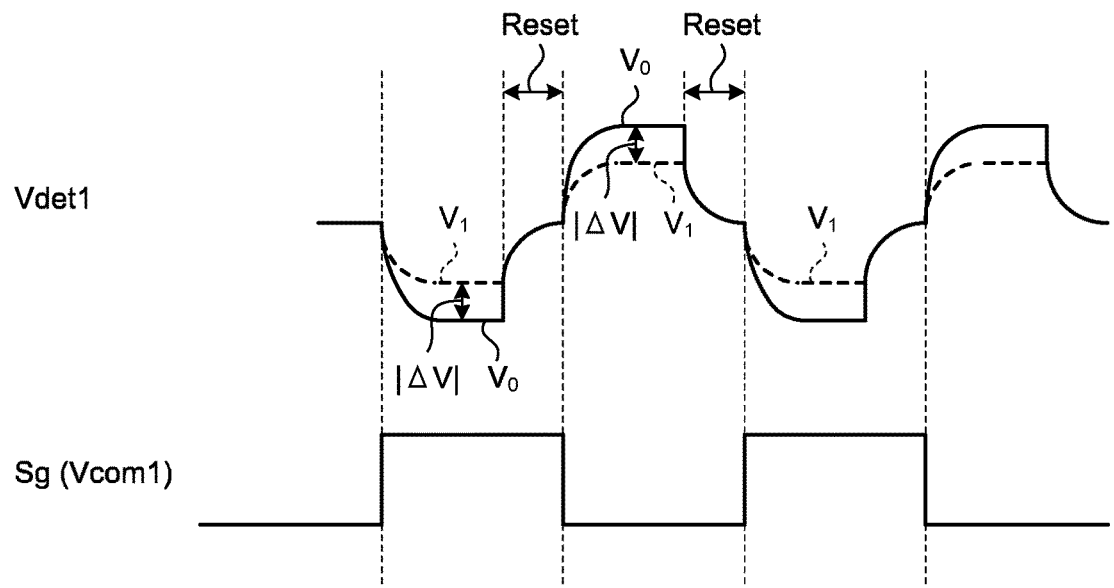
FIG. 7 is a diagram illustrating an example of waveforms of a drive signal and a detection signal in mutual capacitance detection.

The display panel 10 performs touch control based on the basic principle of capacitance touch detection. The following describes the basic principle of mutual capacitance touch detection performed by the display device 1 according to the present embodiment with reference to FIGS. 3 to 7. FIG. 3 is a diagram illustrating the non-present state for explaining the basic principle of mutual capacitance detection. FIG. 4 is an explanatory diagram illustrating an example of an equivalent circuit in mutual capacitance detection in the non-present state. FIG. 5 is a diagram illustrating the contact state for explaining the basic principle of mutual capacitance detection. FIG. 6 is an explanatory diagram illustrating an example of an equivalent circuit in mutual capacitance detection in the contact state. FIG. 7 is a diagram illustrating an example of waveforms of a drive signal and a detection signal in mutual capacitance detection. While the following describes a case where a finger is in contact with or in proximity to a detection electrode, the target object is not limited to a finger and may be an object including a conductor, such as a stylus.

As illustrated in FIG. 3, a capacitance element C1 includes a pair of electrodes, that is, a drive electrode E1 and a detection electrode E2 facing each other with a dielectric D interposed therebetween. The capacitance element C1 generates lines of electric force for a fringe extending from the ends of the drive electrode E1 to the upper surface of the detection electrode E2 in addition to lines of electric force (not illustrated) formed between the facing surfaces of the drive electrode E1 and the detection electrode E2. As illustrated in FIG. 4, a first end of the capacitance element C1 is coupled to an alternating-current (AC) signal source (drive signal source) S, and a second end thereof is coupled to a voltage detector DET. The voltage detector DET is an integration circuit included in the detection signal amplification circuit 42 illustrated in FIG. 2, for example.

When the AC signal source S applies an AC rectangular wave Sg at a predetermined frequency (e.g., a frequency of several kilohertz to several hundred kilohertz) to the drive electrode E1 (first end of the capacitance element C1), an output waveform (the first detection signals Vdet1) illustrated in FIG. 7 appears via the voltage detector DET. The AC rectangular wave Sg corresponds to the first drive signal Vcom1 received from the drive circuit 14.

As illustrated in FIGS. 3 and 4, in the non-present state, an electric current $I_0$ corresponding to a capacitance value of the capacitance element C1 flows. The voltage detector DET illustrated in FIG. 4 converts fluctuations in electric current depending on the AC rectangular wave Sg into fluctuations in voltage (waveform $V_0$ indicated by the solid line (refer to FIG. 7)).

As illustrated in FIGS. 5 and 6, in the contact state, capacitance C2 formed by a finger is in contact with the detection electrode E2 or proximate enough to the detection electrode E2 so as to be equated with being in contact therewith. The lines of electric force for a fringe between the drive electrode E1 and the detection electrode E2 are blocked by the conductor (finger). As a result, the capacitance element C1 acts as a capacitance element C11 having a capacitance value smaller than that in the non-present state. As illustrated in FIGS. 5 and 6, the voltage detector DET converts fluctuations in electric current $I_1$ depending on the AC rectangular wave Sg into fluctuations in voltage (waveform $V_1$ indicated by the dotted line (refer to FIG. 7)).

In this case, the waveform $V_1$ has amplitude smaller than that of the waveform $V_0$. The absolute value $|\Delta V|$ of the voltage difference between the waveform $V_0$ and the waveform $V_1$ varies depending on the influence of an external object, such as a finger, in contact with or in proximity to the detection electrode from the outside. The voltage detector DET resets charge and discharge of a capacitor in accordance with the frequency of the AC rectangular wave Sg by switching in the circuit to have a period Reset. With the period Reset, the voltage detector DET accurately detects the absolute value $|\Delta V|$ of the voltage difference.

As described above, the detection circuit 40 determines whether an external proximity object is in the non-present state or in the contact or proximity state by comparing the absolute value $|\Delta V|$ with the predetermined threshold voltage. The detection circuit 40 thus can perform touch detection based on the basic principle of mutual capacitance detection.

Figure 8:
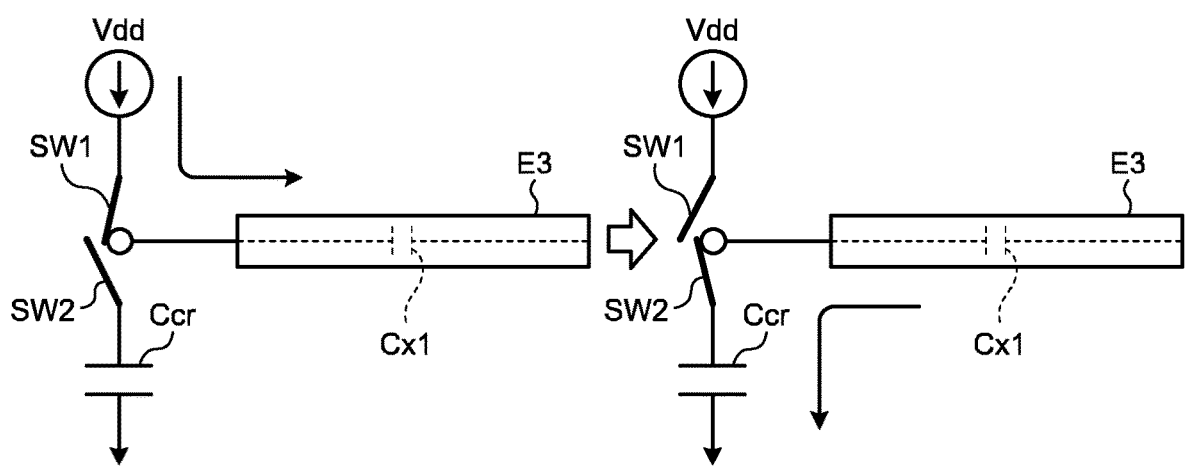
FIG. 8 is a diagram illustrating the non-present state for explaining the basic principle of self-capacitance detection.
Figure 9:
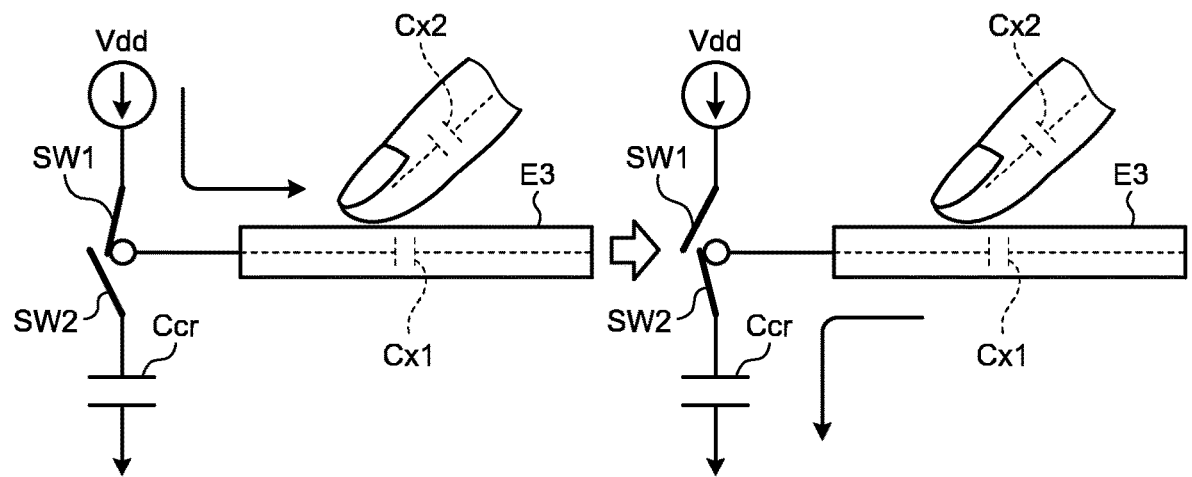
FIG. 9 is a diagram illustrating the contact state for explaining the basic principle of self-capacitance detection.
Figure 10:
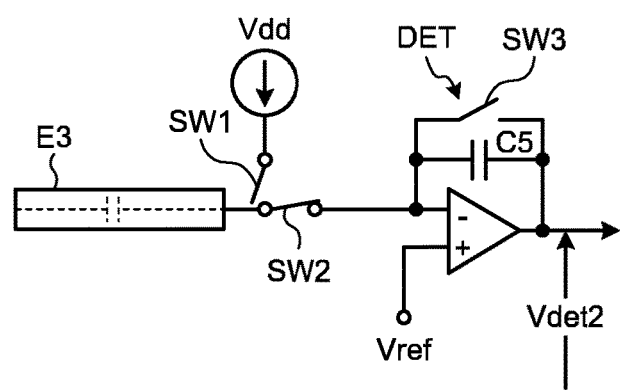
FIG. 10 is an explanatory diagram illustrating an example of an equivalent circuit in self-capacitance detection.
Figure 11:
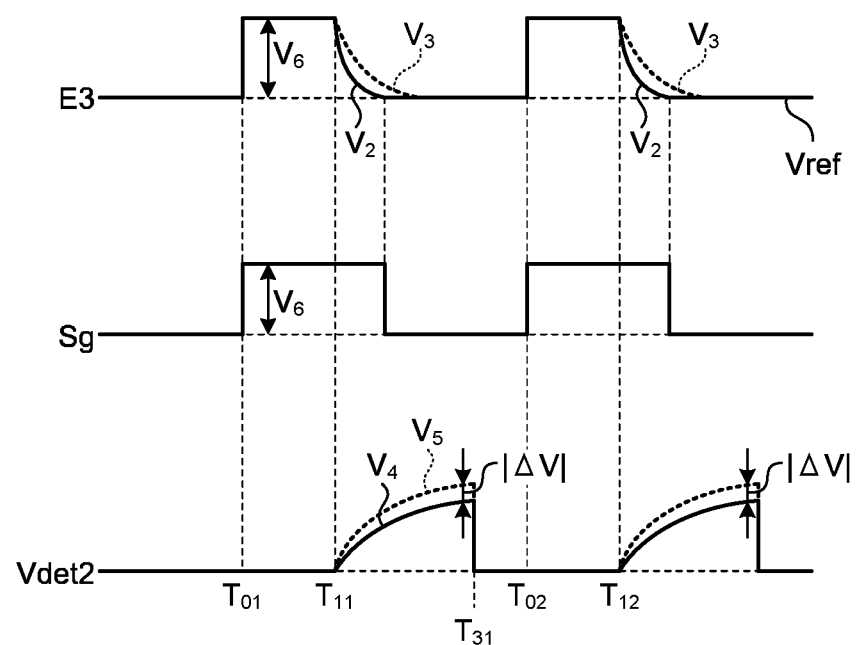
FIG. 11 is a diagram illustrating an example of waveforms of a drive signal and a detection signal in self-capacitance detection.

The following describes the basic principle of self-capacitance detection with reference to FIGS. 8 to 11. FIG. 8 is a diagram illustrating the non-present state for explaining the basic principle of self-capacitance detection. FIG. 9 is a diagram illustrating the contact state for explaining the basic principle of self-capacitance detection. FIG. 10 is an explanatory diagram illustrating an example of an equivalent circuit in self-capacitance detection. FIG. 11 is a diagram illustrating an example of waveforms of a drive signal and a detection signal in self-capacitance detection.

The left figure of FIG. 8 indicates that, in the non-present state, a detection electrode E3 is coupled to a power source Vdd by a switch SW1 but is not coupled to a capacitor Ccr by a switch SW2. In this state, capacitance Cx1 of the detection electrode E3 is charged. The right figure of FIG. 8 indicates that coupling between the power source Vdd and the detection electrode E3 is cut off by the switch SW1, and the detection electrode E3 is coupled to the capacitor Ccr by the switch SW2. In this state, an electric charge in the capacitance Cx1 is discharged via the capacitor Ccr.

The left figure of FIG. 9 indicates that, in the contact state, the detection electrode E3 is coupled to the power source Vdd by the switch SW1 but is not coupled to the capacitor Ccr by the switch SW2. In this state, capacitance Cx2 generated by a finger in proximity to the detection electrode E3 is charged in addition to the capacitance Cx1 of the detection electrode E3. The right figure of FIG. 9 indicates that coupling between the power source Vdd and the detection electrode E3 is cut off by the switch SW1, and the detection electrode E3 is coupled to the capacitor Ccr by the switch SW2. In this state, electric charges in the capacitance Cx1 and the capacitance Cx2 are discharged via the capacitor Ccr.

The voltage change characteristics of the capacitor Ccr in discharging (contact state) illustrated in the right figure of FIG. 9 are clearly different from those of the capacitor Ccr in discharging (non-present state) illustrated in the right figure of FIG. 8, due to the presence of the capacitance Cx2. In the self-capacitance method, whether an input operation is performed by a finger or the like is determined by using the difference of the voltage change characteristics of the capacitor Ccr due to the presence of the capacitance Cx2.

Specifically, an AC rectangular wave Sg (refer to FIG. 11) at a predetermined frequency (e.g., a frequency of several kilohertz to several hundred kilohertz) is applied to the detection electrode E3. The voltage detector DET illustrated in FIG. 10 converts fluctuations in electric current depending on the AC rectangular wave Sg into fluctuations in voltage (waveforms $V_4$ and $V_5$ (refer to FIG. 11)).

As illustrated in FIG. 11, the voltage level of the AC rectangular wave Sg rises to a voltage $V_6$ at time $T_{01}$. At this time, the switch SW1 is turned on, and the switch SW2 is turned off. As a result, the electric potential of the detection electrode E3 also rises to the voltage $V_6$. Subsequently, the switch SW1 is turned off before time $T_{11}$. While the detection electrode E3 is in a floating state at this time, the electric potential of the detection electrode E3 is maintained at $V_6$ due to the capacitance Cx1 (or Cx1+Cx2, refer to FIG. 9) of the detection electrode E3. The voltage detector DET performs a reset operation before time $T_{11}$. The reset operation makes an output voltage substantially equal to Vref.

Subsequently, when the switch SW2 is turned on at time $T_{11}$, the electric charge accumulated in the capacitance Cx1 (or Cx1+Cx2) of the detection electrode E3 moves to capacitance C5 in the voltage detector DET. As a result, output from the voltage detector DET increases (refer to the second detection signal Vdet2 in FIG. 11). In the non-present state, the output (second detection signal Vdet2) from the voltage detector DET corresponds to a waveform $V_2$ indicated by the solid line, and Vdet2=Cx1×$V_6$/C5 is satisfied. In the contact state, the output corresponds to a waveform $V_3$ indicated by the dotted line, and Vdet2=(Cx1+Cx2)×$V_6$/C5 is satisfied.

Subsequently, at time $T_{31}$, the switch SW2 is turned off, and the switch SW1 and a switch SW3 are turned on. As a result, the electric potential of the detection electrode E3 is reduced to a low level equal to the electric potential of the AC rectangular wave Sg, and the voltage detector DET is reset. Subsequently, time $T_{02}$ and time $T_{12}$ follow, and the operation described above is repeated at a predetermined frequency (e.g., a frequency of several kilohertz to several hundred kilohertz). The detection circuit 40 thus can perform touch detection based on the basic principle of self-capacitance detection.

Figure 12:
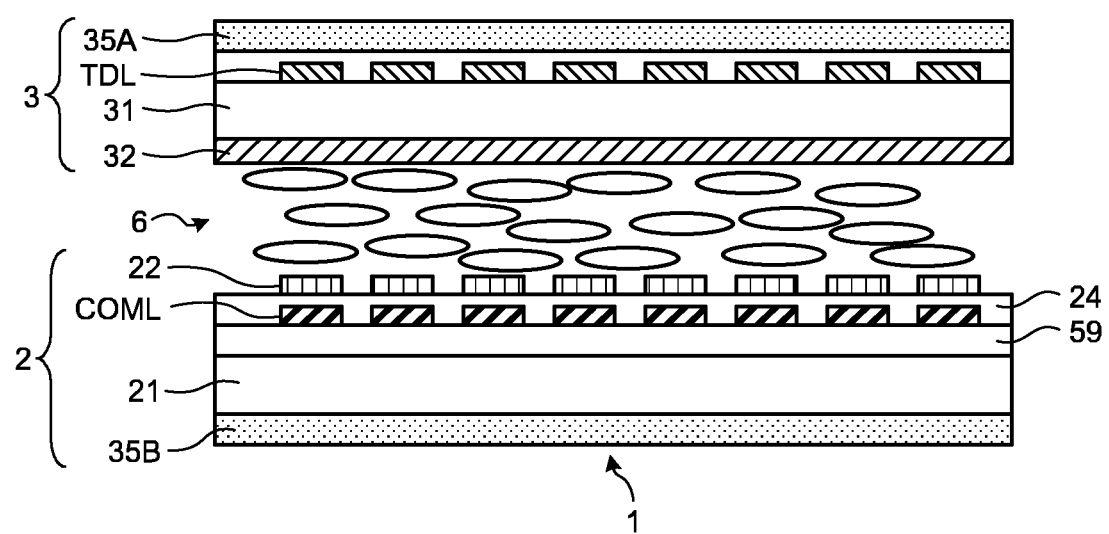
FIG. 12 is a sectional view illustrating a schematic sectional structure of the detection device and the display device according to the first embodiment.

The following describes an exemplary configuration of the display device 1 according to the present embodiment in greater detail. FIG. 12 is a sectional view illustrating a schematic sectional structure of the detection device and the display device according to the first embodiment. As illustrated in FIG. 12, the display panel 10 includes a pixel substrate 2, a counter substrate 3, and a liquid crystal layer 6 serving as a display functional layer. The counter substrate 3 faces the pixel substrate 2 in a direction perpendicular to the surface of the pixel substrate 2. The liquid crystal layer 6 is interposed between the pixel substrate 2 and the counter substrate 3.

The pixel substrate 2 includes a first substrate 21, pixel electrodes 22, the first electrodes COML, a polarizing plate 35B, and an insulating layer 59. The first substrate 21 is provided with circuits, such as a gate scanner included in the gate driver 12, switching elements, such as thin-film transistors (TFT), and various kinds of wiring (not illustrated in FIG. 12), such as gate lines GCL and signal lines SGL.

The pixel electrodes 22 are provided on the first electrodes COML with an insulating layer 24 interposed therebetween. The pixel electrodes 22 are disposed in a matrix (row-column configuration) in planar view. The polarizing plate 35B is provided below the first substrate 21.

In the present disclosure, an "upper side" indicates a direction from the first substrate 21 toward a second substrate 31 in a direction perpendicular to the first substrate 21, and a "lower side" indicates a direction from the second substrate 31 toward the first substrate 21. The "planar view" indicates a view seen from the direction perpendicular to the surface of the first substrate 21.

Figure 14:
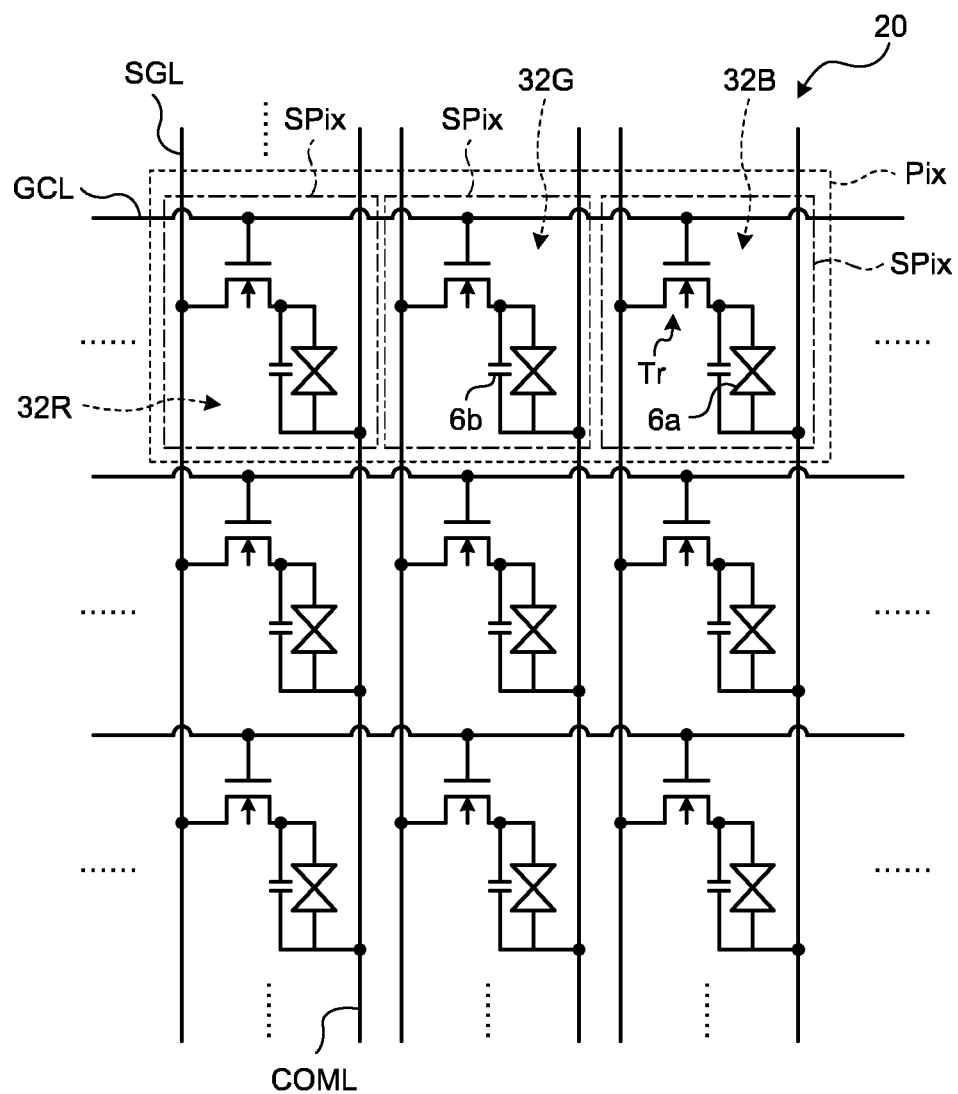
FIG. 14 is a circuit diagram illustrating a pixel array in a display region according to the present embodiment.

The pixel electrodes 22 correspond to the respective sub-pixels SPix constituting each pixel Pix of the display panel 10 (refer to FIG. 14). The pixel electrodes 22 are supplied with the pixel signals Vpix for performing a display operation. In the display operation, the first electrodes COML are supplied with the direct-current (DC) drive signals Vcomdc for display to serve as common electrodes for the pixel electrodes 22.

The pixel electrodes 22 and the first electrodes COML according to the present embodiment are made of a translucent conductive material, such as indium tin oxide (ITO).

The counter substrate 3 includes the second substrate 31, a color filter 32, the second electrodes TDL, and a polarizing plate 35A. The color filter 32 is provided on one surface of the second substrate 31. The second electrodes TDL are provided on the other surface of the second substrate 31. The second electrodes TDL are arrayed on the second substrate 31. The second electrodes TDL serve not only as detection electrodes in mutual capacitance detection but also as detection electrodes in self-capacitance hover detection. The display device 1 includes the display panel 10 including the sensor region 30 serving as the detection device that detects a target object, and the display region 20. The second electrodes TDL are provided in a region overlapping with the display region.

The color filter 32 faces the liquid crystal layer 6 in the direction perpendicular to the first substrate 21. The color filter 32 may be disposed on the first substrate 21. The first substrate 21 and the second substrate 31 according to the present embodiment are glass substrates or resin substrates, for example.

The first substrate 21 and the second substrate 31 face each other with a predetermined space interposed therebetween. The liquid crystal layer 6 is provided between the first substrate 21 and the second substrate 31. The liquid crystal layer 6 modulates light passing therethrough depending on the state of an electric field. The liquid crystal layer 6, for example, includes liquid crystal in a lateral electric-field mode, such as n in-plane switching (IPS) mode including a fringe field switching (FFS) mode. An orientation film (not illustrated in FIG. 12) is provided between the liquid crystal layer 6 and the pixel substrate 2, and between the liquid crystal layer 6 and the counter substrate 3 illustrated in FIG. 12.

An illumination device (backlight), which is not illustrated, is provided under the first substrate 21. The illumination device includes a light source, such as a light emitting diode (LED), and outputs light from the light source to the first substrate 21. The light from the illumination device passes through the pixel substrate 2 and is modulated depending on the state of liquid crystal at a corresponding position. The state of light transmission to the display surface varies depending on the positions. With this mechanism, an image is displayed on the display surface.

Figure 13:
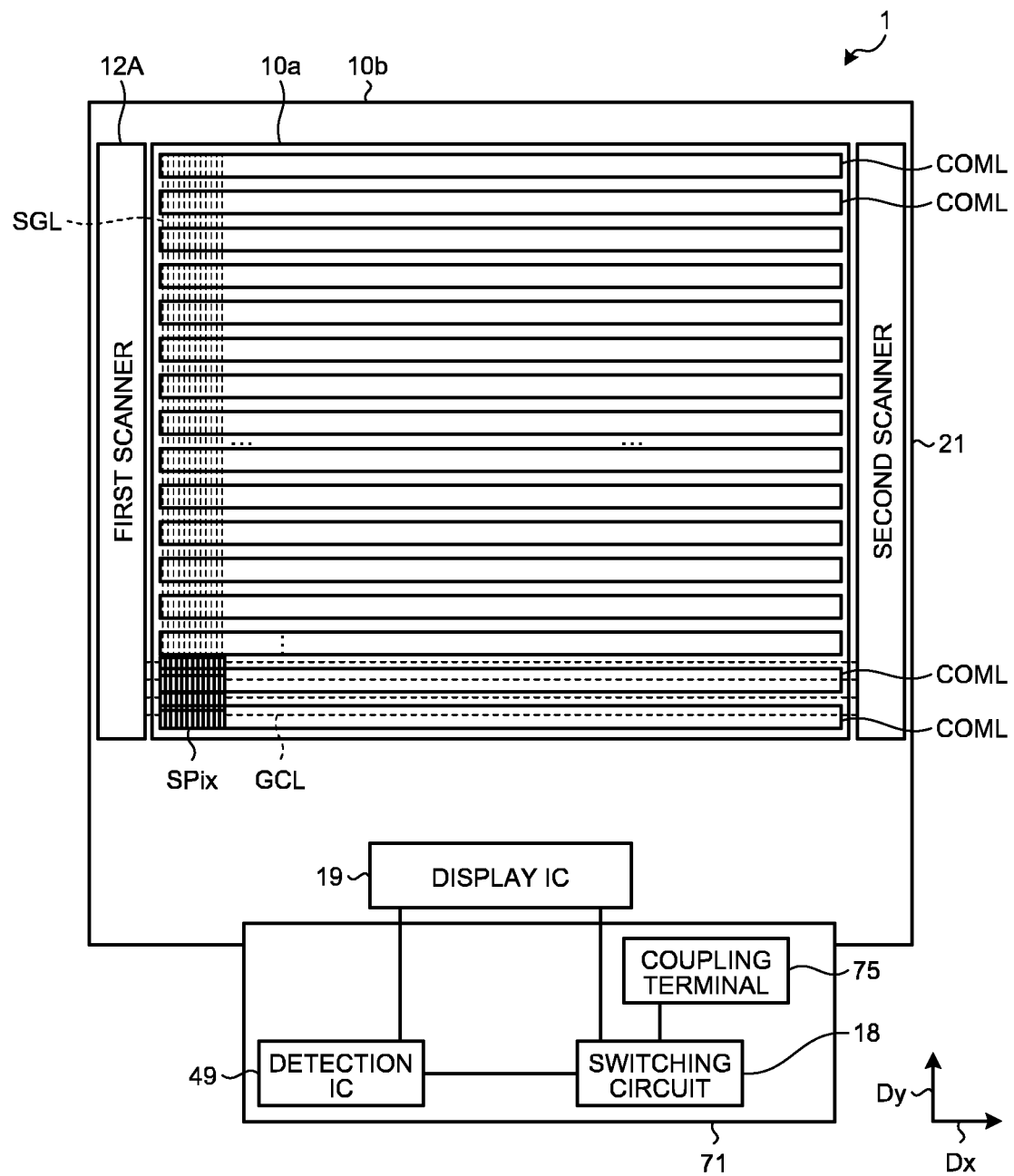
FIG. 13 is a plan view schematically illustrating a first substrate.

FIG. 13 is a plan view schematically illustrating the first substrate. As illustrated in FIG. 13, the display device 1 has a peripheral region 10b outside an active area 10a. In the present disclosure, the active area 10a is an area for displaying an image and overlapping with a plurality of pixels Pix (sub-pixels SPix). The peripheral region 10b is a region inside the outer periphery of the first substrate 21 and outside the active area 10a. The peripheral region 10b may have a frame shape surrounding the active area 10a. In this case, the peripheral region 10b may also be referred to as a frame region.

A first direction Dx according to the present embodiment extends along the long side of the active area 10a. A second direction Dy is orthogonal to the first direction Dx. The directions Dx and Dy are not limited thereto, and the second direction Dy may intersect the first direction Dx at an angle other than 90 degrees. The plane defined by the first direction Dx and the second direction Dy is parallel to the surface of the first substrate 21. The direction orthogonal to the first direction Dx and the second direction Dy is the thickness direction of the first substrate 21.

As illustrated in FIG. 13, the first electrodes COML extend in the first direction Dx and are arrayed in the second direction Dy in the active area 10a. In other words, the first electrodes COML extend along the long side of the active area 10a and are arrayed along the short side thereof.

A plurality of sub-pixels SPix are disposed in a matrix (row-column configuration) at a position corresponding to one first electrode COML. The sub-pixel SPix has an area smaller than that of the first electrode COML. The signal lines SGL and the gate lines GCL are provided in a corresponding manner to a plurality of sub-pixels SPix. The signal lines SGL extend in the second direction Dy and are arrayed in the first direction Dx. The gate lines GCL intersect the signal lines SGL in planar view, extend in the first direction Dx, and are arrayed in the second direction Dy. While FIG. 13 illustrates part of the sub-pixels SPix, the signal lines SGL, and the gate lines GCL, they are disposed across the entire active area 10a.

The first electrodes COML according to the present embodiment extend in a direction parallel to the extending direction of the gate lines GCL and in a direction intersecting the signal lines SGL in planar view. The first electrodes COML according to the first embodiment are strip electrodes extending linearly.

The pixel electrodes 22 are not necessarily arrayed in the first direction Dx and the second direction Dy intersecting the first direction Dx, that is, in a matrix (row-column configuration). Alternatively, a configuration may be employed in which the pixel electrodes 22 adjacent to each other are shifted in the first direction Dx or the second direction Dy. Still alternatively, a configuration may be employed in which the pixel electrodes 22 adjacent to each other have different sizes, and two or three pixel electrodes 22 are disposed on one side of one pixel electrode 22 included in a pixel column arrayed in the first direction Dx.

A first scanner 12A and a second scanner 12B are provided in the peripheral region 10b. The drive circuit 14 (refer to FIG. 1) is coupled to the first electrodes COML via the first scanner 12A and the second scanner 12B. The first electrodes COML are sandwiched between the first scanner 12A and the second scanner 12B.

A switching circuit 18, a coupling terminal 75, and a display integrated circuit (IC) 19 are provided on a long side of the peripheral region 10b. The switching circuit 18 switches between coupling and decoupling of the second electrodes TDL to be a target of detection drive to and from the detection circuit 40, in accordance with control signals Vsc1 and Vsc2, which will be described later, supplied from the control circuit 11. A flexible substrate 71 is coupled to the long side of the peripheral region 10b. The flexible substrate 71 is provided with a detection IC 49. The display IC 19 serves as the control circuit 11 illustrated in FIG. 1. Part of the functions of the detection circuit 40 may be included in the detection IC 49 or provided as functions of an external micro-processing unit (MPU). The configuration of the display IC 19 or the detection IC 49 is not limited thereto, and the display IC 19 or the detection IC 49 may be provided to an external control substrate outside the module, for example.

The first electrodes COML are electrically coupled to the display IC 19.

The following describes a display operation performed by the display panel 10. FIG. 14 is a circuit diagram illustrating a pixel array in the display region according to the present embodiment. The first substrate 21 (refer to FIG. 12) is provided with switching elements Tr of the respective sub-pixels SPix, the signal lines SGL, the gate lines GCL, and other components as illustrated in FIG. 14. The signal lines SGL are wiring that supplies the pixel signals Vpix to the pixel electrodes 22. The gate lines GCL are wiring that supplies drive signals for driving the switching elements Tr. The signal lines SGL and the gate lines GCL extend on a plane parallel to the surface of the first substrate 21.

The display region 20 illustrated in FIG. 14 includes the sub-pixels SPix arrayed in a matrix (row-column configuration). The sub-pixels SPix each include the switching element Tr and a liquid crystal element 6a. The switching element Tr is a thin-film transistor and is an n-channel metal oxide semiconductor (MOS) TFT in this example. The insulating layer 24 is provided between the pixel electrodes 22 and the first electrodes COML to form holding capacitance 6b illustrated in FIG. 14.

The gate driver 12 illustrated in FIG. 1 sequentially selects the gate line GCL. The gate driver 12 applies the scanning signals Vscan to the gates of the switching elements Tr of the respective sub-pixels SPix via the selected gate line GCL. As a result, one row (one horizontal line) of sub-pixels SPix out of the sub-pixels SPix is sequentially selected as a target of display drive. The source driver 13 supplies the pixel signals Vpix to the sub-pixels SPix included in the selected horizontal line via the signal lines SGL. The sub-pixels SPix perform display on a one horizontal line-by-one horizontal line basis in accordance with the supplied pixel signals Vpix.

To perform the display operation, the drive circuit 14 applies the drive signals Vcomdc for display to the first electrodes COML. The drive signal Vcomdc for display is a voltage signal serving as a common potential for the sub-pixels SPix. As a result, the first electrodes COML serve as common electrodes for the pixel electrodes 22 in the display operation. To perform display, the drive circuit 14 applies the drive signals Vcomdc to all the first electrodes COML in the active area 10a.

The color filter 32 illustrated in FIG. 12 may include periodically arrayed color areas in three colors of red (R), green (G), and blue (B), for example. The color areas 32R, 32G, and 32B in the respective three colors of R, G, and B, which serve as a set, correspond to the respective sub-pixels SPix illustrated in FIG. 14. A set of sub-pixels SPix corresponding to the respective color areas 32R, 32G, and 32B in the three colors constitutes one pixel Pix. The color filter 32 may include color areas in four or more colors.

Figure 15:
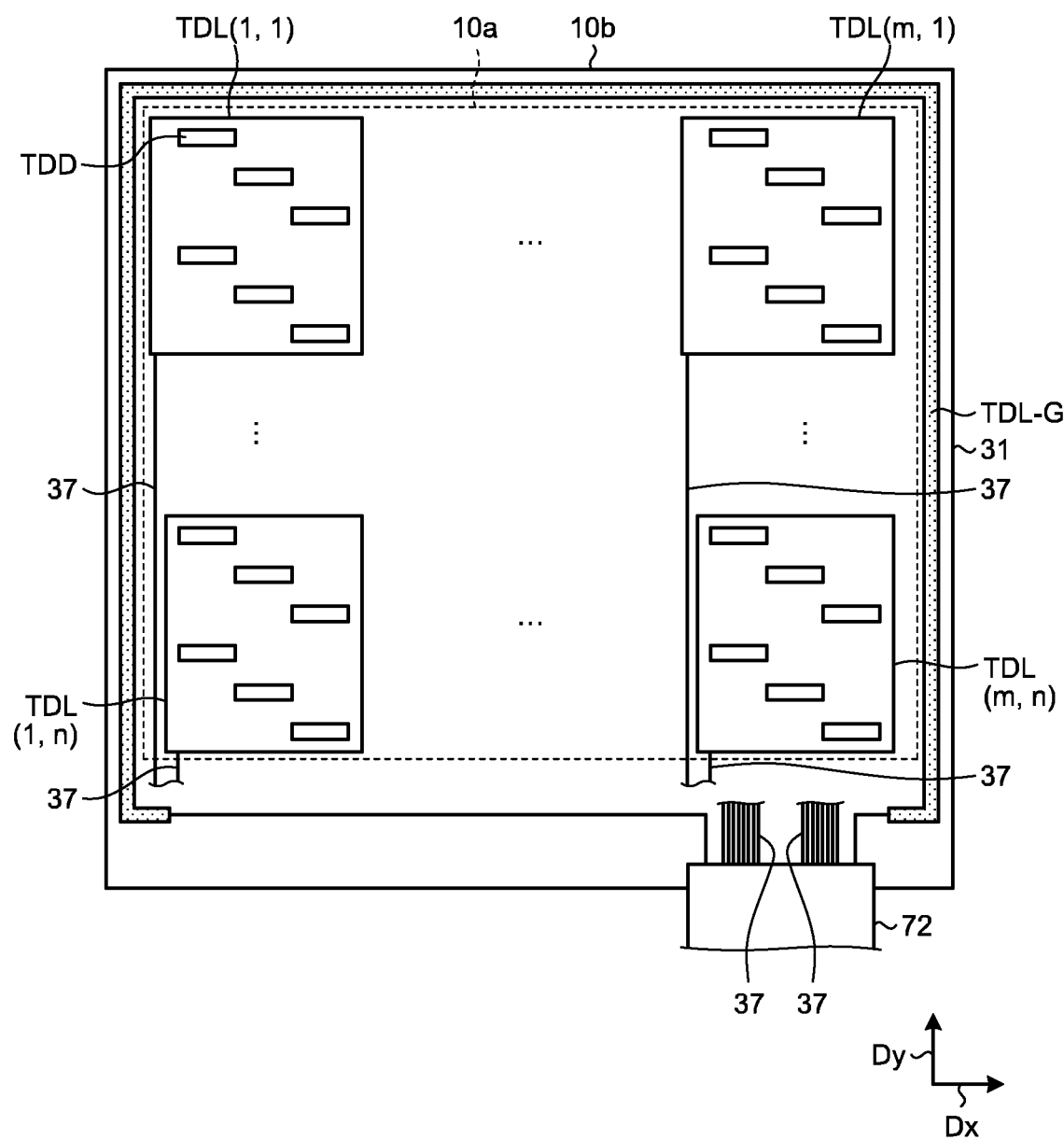
FIG. 15 is a plan view schematically illustrating a second substrate.

The following describes a configuration of the second electrodes TDL. FIG. 15 is a plan view schematically illustrating the second substrate. As illustrated in FIG. 15, the second electrodes TDL are arrayed in a matrix (row-column configuration) in the active area 10a of the second substrate 31. Second electrodes TDL(1, 1), TDL(1, 2), . . . , and TDL(1, n) are arrayed in the second direction Dy, for example. Second electrodes TDL(1, 1), TDL(2, 1), . . . , and TDL(m, 1) are arrayed in the first direction Dx. Consequently, second electrodes TDL(m, 1) . . . , and TDL(m, n) are arrayed in the second direction Dy. The second electrodes TDL(1, 1), . . . , TDL(1, n), . . . , TDL(m, 1), . . . and TDL(m, n) are simply referred to as the second electrodes TDL when they need not be distinguished from one another.

The second electrodes TDL are made of a translucent conductive material, such as ITO. The second electrodes TDL are not necessarily made of ITO and may include metal thin wires made of a metal material like a fourth embodiment of the present disclosure, which will be described later, for example.

Conductive outer edge wires TDL-G called a guard ring and a flexible substrate 72 are provided in the peripheral region 10b of the second substrate 31. The outer edge wires TDL-G surround the second electrodes TDL. The second electrodes TDL are disposed inside the outer edge wires TDL-G. Both ends of the outer edge wires TDL-G are electrically coupled to the flexible substrate 72.

The second electrodes TDL are coupled to the flexible substrate 72 via respective coupling wires 37. The flexible substrate 72 is coupled to the coupling terminal 75 of the first substrate 21 illustrated in FIG. 13. Accordingly, the second electrodes TDL are electrically coupled to the switching circuit 18 via the respective coupling wires 37, the flexible substrate 72, and the coupling terminal 75.

Figure 16:
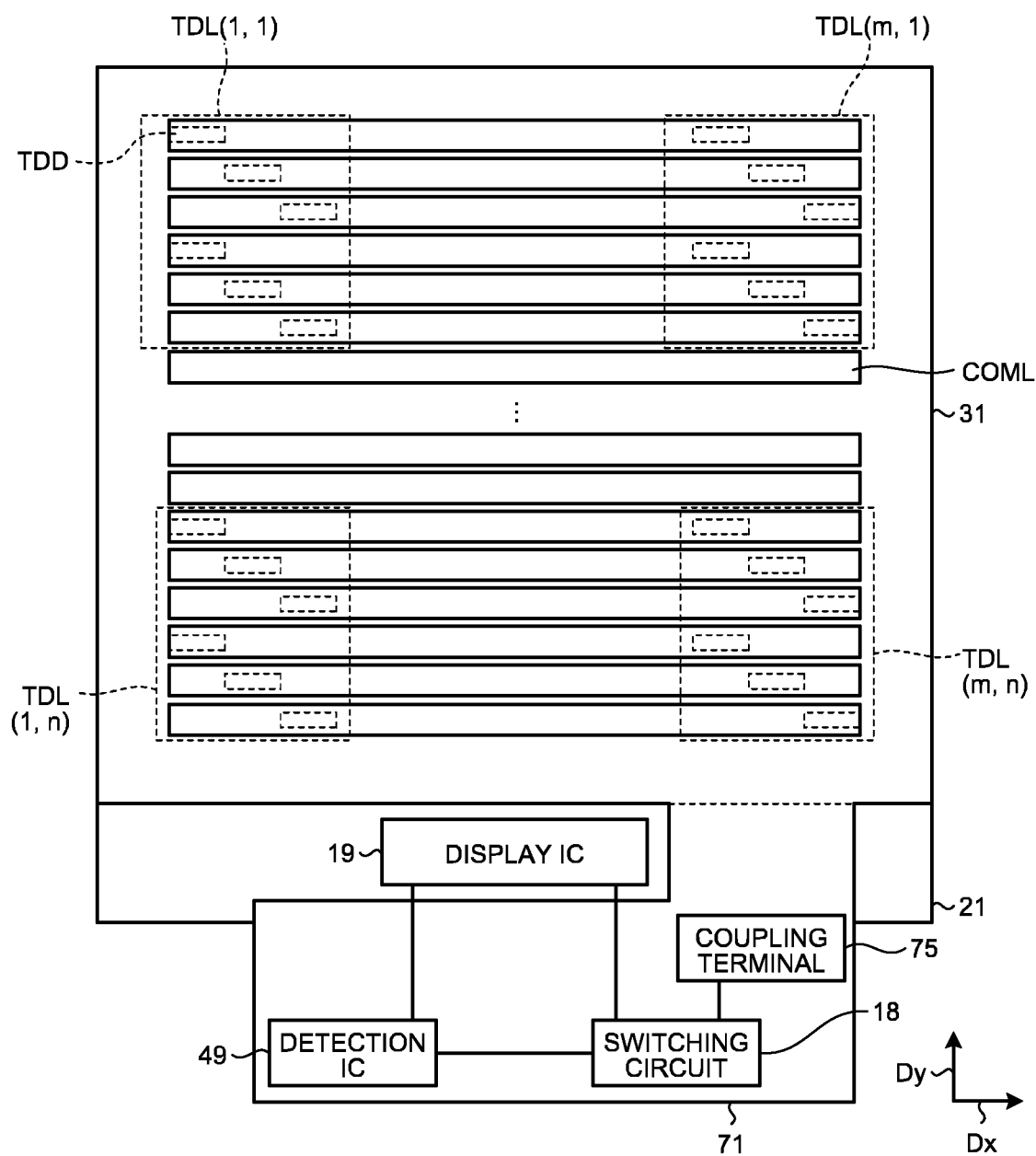
FIG. 16 is a schematic diagram for explaining a relation between first electrodes and second electrodes.

FIG. 16 is a schematic diagram for explaining a relation between first electrodes and second electrodes. The second electrodes TDL are arrayed in a row-column configuration in the first direction Dx and the second direction Dy. The second electrode TDL overlaps with six first electrodes COML in planar view, for example. In the overlapping regions of the second electrode TDL and the first electrodes COML, capacitance is formed between the second electrode TDL and the first electrodes COML.

In touch detection, the drive circuit 14 (refer to FIG. 1) supplies the first drive signals Vcom1 to the first electrodes COML via the first scanner 12A and the second scanner 12B.

The second electrodes TDL output, to the detection circuit 40 via the switching circuit 18, the first detection signals Vdet1 corresponding to changes in capacitance between the second electrodes TDL and the first electrodes COML. The detection circuit 40 performs detection by the mutual capacitance method described above in accordance with the first detection signals Vdet1, thereby detecting touch input. The drive circuit 14 sequentially drives the first electrodes COML in the active area 10a to perform touch detection. As described above, the first electrodes COML serve as drive electrodes in mutual capacitance touch detection. The coordinate extraction circuit 45 thus can detect the position of the target object in the contact state.

In touch detection, the first electrodes COML (refer to FIG. 13) not supplied with the first drive signals Vcom1 may be in a floating state where no voltage signal is supplied thereto and their electric potential is not fixed. Alternatively, the drive circuit 14 may supply voltage signals having a fixed electric potential to the first electrodes COML not supplied with the first drive signals Vcom1.

In touch detection, the outer edge wires TDL-G is in a floating state where no voltage signal is supplied thereto and its electric potential is not fixed. Alternatively, the drive circuit 14 may supply DC voltage signals having a fixed electric potential to the outer edge wires TDL-G. This mechanism can reduce parasitic capacitance in the second electrodes TDL, thereby increasing detection accuracy.

As described above, the second electrode TDL serves as one detection electrode in mutual capacitance touch detection. The outer shape of the second electrode TDL is a rectangle.

Figure 17:
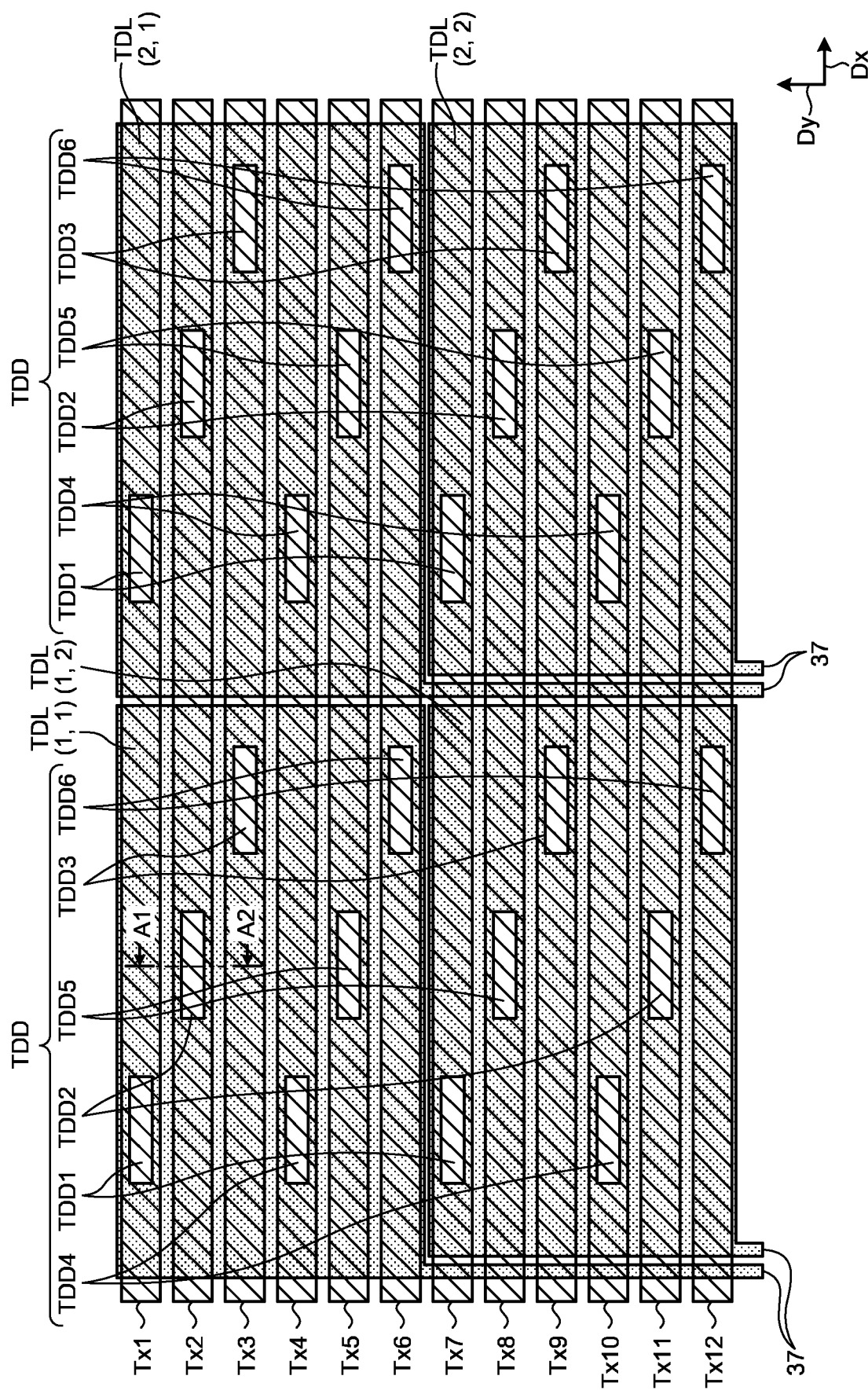
FIG. 17 is a schematic diagram for explaining a relation between electric-field transmission regions and the first electrodes according to the first embodiment.

FIG. 17 is a schematic diagram for explaining a relation between the electric-field transmission regions and the first electrodes according to the first embodiment. As illustrated in FIG. 17, the first electrodes COML arrayed in the second direction Dy are referred to as first electrodes Tx1, . . . , Tx12, . . . . The first electrodes Tx1, . . . , and Tx12 are simply referred to as the first electrodes COML as described above when they need not be distinguished from one another.

As illustrated in FIG. 17, the second electrodes TDL(1, 1), TDL(1, 2), TDL(2, 1), and TDL(2, 2) each have electric-field transmission regions TDD1, TDD2, TDD3, TDD4, TDD5, and TDD6. The electric-field transmission regions TDD1, TDD2, TDD3, TDD4, TDD5, and TDD6 have the same area. Similarly, the second electrodes TDL(1, 1), TDL(1, 2), . . . , TDL(1, n), TDL(2, 1), . . . , and TDL(m, 1) each have the electric-field transmission regions TDD1, TDD2, TDD3, TDD4, TDD5, and TDD6. The electric-field transmission regions TDD1, TDD2, TDD3, TDD4, TDD5, and TDD6 are simply referred to as the electric-field transmission regions TDD when they need not be distinguished from one another.

As illustrated in FIG. 17, one second electrode TDL has six electric-field transmission regions TDD inside thereof in planar view. As illustrated in FIG. 17, in one second electrode TDL, the electric-field transmission regions TDD1, TDD2, TDD3, TDD4, TDD5, and TDD6 are disposed at positions not overlapping with one another. The positions of the electric-field transmission regions TDD1, TDD2, TDD3, TDD4, TDD5, and TDD6 in each of the second electrodes TDL, which are defined by the first direction Dx and the second direction Dy, are stored in advance in the control circuit 11 as the coordinates.

As illustrated in FIG. 17, the electric-field transmission region TDD1 in the second electrode TDL(1, 1) overlaps with the first electrode Tx1 in planar view. The electric-field transmission region TDD2 in the second electrode TDL(1, 1) overlaps with the first electrode Tx2 in planar view. The electric-field transmission region TDD3 in the second electrode TDL(1, 1) overlaps with the first electrode Tx3 in planar view. The electric-field transmission region TDD4 in the second electrode TDL(1, 1) overlaps with the first electrode Tx4 in planar view. The electric-field transmission region TDD5 in the second electrode TDL(1, 1) overlaps with the first electrode Tx5 in planar view. The electric-field transmission region TDD6 in the second electrode TDL(1, 1) overlaps with the first electrode Tx6 in planar view.

As illustrated in FIG. 17, the electric-field transmission region TDD1 in the second electrode TDL(2, 1) overlaps with the first electrode Tx1 in planar view. The electric-field transmission region TDD2 in the second electrode TDL(2, 1) overlaps with the first electrode Tx2 in planar view. The electric-field transmission region TDD3 in the second electrode TDL(2, 1) overlaps with the first electrode Tx3 in planar view. The electric-field transmission region TDD4 in the second electrode TDL(2, 1) overlaps with the first electrode Tx4 in planar view. The electric-field transmission region TDD5 in the second electrode TDL(2, 1) overlaps with the first electrode Tx5 in planar view. The electric-field transmission region TDD6 in the second electrode TDL(2, 1) overlaps with the first electrode Tx6 in planar view. The electric-field transmission region TDD1 in the second electrode TDL(2, 1) overlaps with the first electrode Tx1 at a position different from the position of the electric-field transmission region TDD1 in the second electrode TDL(1, 1). Similarly, the electric-field transmission regions TDD2, TDD3, TDD4, TDD5, and TDD6 in the second electrode TDL(2, 1) overlap with the respective first electrodes at positions different from the positions of the electric-field transmission regions TDD2, TDD3, TDD4, TDD5, and TDD6, respectively, in the second electrode TDL(1, 1).

As illustrated in FIG. 17, the electric-field transmission region TDD1 in the second electrode TDL(1, 2) overlaps with the first electrode Tx7 in planar view. The electric-field transmission region TDD2 in the second electrode TDL(1, 2) overlaps with the first electrode Tx8 in planar view. The electric-field transmission region TDD3 in the second electrode TDL(1, 2) overlaps with the first electrode Tx9 in planar view. The electric-field transmission region TDD4 in the second electrode TDL(1, 2) overlaps with the first electrode Tx10 in planar view. The electric-field transmission region TDD5 in the second electrode TDL(1, 2) overlaps with the first electrode Tx11 in planar view. The electric-field transmission region TDD6 in the second electrode TDL(1, 2) overlaps with the first electrode Tx12 in planar view.

As illustrated in FIG. 17, the electric-field transmission region TDD1 in the second electrode TDL(2, 2) overlaps with the first electrode Tx7 in planar view. The electric-field transmission region TDD2 in the second electrode TDL(2, 2) overlaps with the first electrode Tx8 in planar view. The electric-field transmission region TDD3 in the second electrode TDL(2, 2) overlaps with the first electrode Tx9 in planar view. The electric-field transmission region TDD4 in the second electrode TDL(2, 2) overlaps with the first electrode Tx10 in planar view. The electric-field transmission region TDD5 in the second electrode TDL(2, 2) overlaps with the first electrode Tx11 in planar view. The electric-field transmission region TDD6 in the second electrode TDL(2, 2) overlaps with the first electrode Tx12 in planar view. The electric-field transmission region TDD1 in the second electrode TDL(2, 2) overlaps with the first electrode Tx7 at a position different from the position of the electric-field transmission region TDD1 in the second electrode TDL(1, 2). Similarly, the electric-field transmission regions TDD2, TDD3, TDD4, TDD5, and TDD6 in the second electrode TDL(2, 2) overlap with the respective first electrodes at positions different from the positions of the electric-field transmission regions TDD2, TDD3, TDD4, TDD5, and TDD6, respectively, in the second electrode TDL(1, 2).

Figure 18:
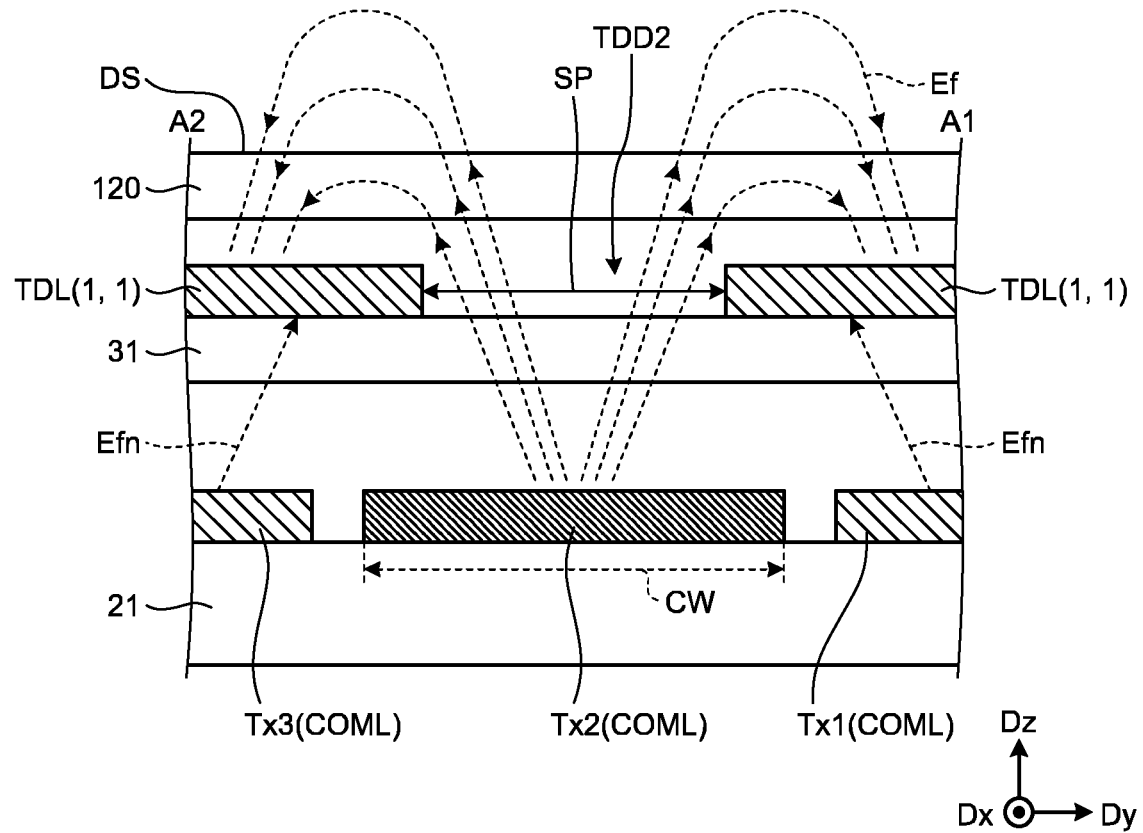
FIG. 18 is an explanatory diagram schematically illustrating lines of electric force of a fringe electric field generated between the first electrodes and the second electrode in touch detection.

FIG. 18 is an explanatory diagram schematically illustrating lines of electric force of a fringe electric field generated between the first electrodes and the second electrode in touch detection. Specifically, FIG. 18 is a sectional view schematically illustrating a section along line A1-A2 in FIG. 17. As illustrated in FIG. 18, the second electrode TDL provided to the second substrate 31 is on the upper side than the first electrodes COML provided to the first substrate 21. As described above, the second electrode TDL serves as a detection electrode in mutual capacitance detection.

When the first drive signals Vcom1 are sequentially supplied to the first electrodes COML in touch detection, the first drive signals Vcom1 are supplied to the first electrode Tx1 and then to the first electrode Tx2. Subsequently, the first drive signals Vcom1 are supplied to the first electrode Tx3.

As illustrated in FIG. 18, when the first drive signals Vcom1 are supplied to the first electrode Tx1, lines of electric force Efn of a fringe electric field are generated between the first electrode Tx1 and the second electrode TDL(1, 1). In the section along line A1-A2 in FIG. 17, the second electrode TDL(1, 1) overlaps with the first electrode Tx1. With this structure, the lines of electric force Efn of the fringe electric field fail to extend from the second electrode TDL(1, 1) toward the upper side of a detection surface DS, whereby the electric field is blocked.

Subsequently, when the first drive signals Vcom1 are supplied to the first electrode Tx2, lines of electric force Ef of a fringe electric field are generated between the first electrode Tx2 and the second electrode TDL(1, 1). In the section along line A1-A2 in FIG. 17, the electric-field transmission region TDD2 is disposed above the first electrode Tx2. With this structure, the lines of electric force Ef of the fringe electric field extend from the second electrode TDL toward the upper side of the detection surface DS. In FIG. 18, the detection surface DS serves as the surface of a cover glass 120. The detection surface DS is not limited thereto and may be the surface of another member provided at the uppermost part of the display device 1 or the surface of a protective layer provided to the second substrate 31.

Subsequently, when the first drive signals Vcom1 are supplied to the first electrode Tx3, lines of electric force Efn of a fringe electric field are generated between the first electrode Tx3 and the second electrode TDL(1, 1). In the section along line A1-A2 in FIG. 17, the second electrode TDL(1, 1) overlaps with the first electrode Tx3. With this structure, the lines of electric force Efn of the fringe electric field fail to extend from the second electrode TDL(1, 1) toward the upper side of the detection surface DS, whereby the electric field is blocked.

Increasing the area of the second electrodes TDL in planar view can increase detection sensitivity in hover detection. If the area of the second electrodes TDL in planar view is increased, however, the second electrodes TDL facing the first electrodes COML block the fringe electric field. This may reduce the fringe electric field passing through the second electrodes TDL, thereby decreasing detection sensitivity in touch detection.

By contrast, the detection device according to the first embodiment makes the fringe electric field less likely to be blocked in the electric-field transmission regions TDD. With this configuration, the fringe electric field passing through the second electrodes TDL is less likely to be reduced. Even if the area of the second electrodes TDL in planar view is increased, the detection device according to the first embodiment can increase detection sensitivity in both of touch detection and hover detection.

The electric-field transmission regions TDD according to the first embodiment are not provided with the conductive material of the second electrodes TDL. The electric-field transmission regions TDD may be provided with dummy electrodes not serving as detection electrodes. The dummy electrodes are made of a conductive material the electric potential of which is not fixed. The conductive material may be a translucent conductive material, such as ITO.

As illustrated in FIG. 17, the electric-field transmission region TDD as a whole has a substantially rectangular outer shape, in which a length in the first direction Dx is longer than that in the second direction Dy, i.e., the longitudinal direction of the electric-field transmission region TDD is the first direction Dx. As illustrated in FIG. 17, the electric-field transmission regions TDD overlap with the respective first electrodes COML arrayed in the second direction Dy in planar view.

As illustrated in FIG. 18, a width SP in the second direction Dy of the electric-field transmission region TDD is smaller than a width CW in the second direction Dy of the first electrode COML facing the electric-field transmission region TDD. In each of the second electrodes TDL, the electric-field transmission regions TDD limit the positions where the fringe electric field can reach the upper side of the detection surface DS from the respective first electrodes COML facing the second electrode TDL.

To detect the target object that is positioned substantially 5 cm above the detection surface DS, for example, the length of the second electrode TDL in the first direction Dx is from 10 mm to 30 mm inclusive, for example, and the length thereof in the second direction Dy is from 10 mm to 30 mm inclusive. The width SP of the electric-field transmission region TDD in the second direction Dy is set according to a distance between the first electrode COML and the second electrode TDL, and from 0.5 mm to 2 mm inclusive, for example. The width CW in the second direction Dy of the first electrode COML facing the electric-field transmission region TDD only needs to be larger than the width SP in the second direction Dy of the electric-field transmission region TDD. A distance between the first electrodes COML disposed side by side is several micrometers, for example. A first electrode COML not supplied with the first drive signals Vcom1 may be disposed between the first electrodes COML overlapping with the electric-field transmission regions TDD. When the first drive signals Vcom1 are sequentially supplied to the first electrodes COML, fringe electric fields extend from the respective first electrodes COML through the electric-field transmission regions TDD. The fringe electric fields can extend to the upper side of the detection surface DS like the lines of electric force Ef illustrated in FIG. 18. Accordingly, the detection device can desirably perform touch detection.

As described above, if a touch is detected, the detection circuit 40 calculates the coordinates at which the touch input is performed. In this case, the detection circuit 40 identifies any one of the first electrodes COML out of the first electrodes Tx1, . . . , Tx12, . . . supplied with the first drive signals Vcom1. In the electric-field transmission region TDD in the second electrode TDL overlapping with the identified first electrode COML, the detection circuit 40 detects the target object in contact with the detection surface, in accordance with the first detection signals Vdet1 corresponding to changes in mutual capacitance between the first electrode COML and the second electrode TDL. Specifically, the detection circuit 40 identifies any one of the second electrodes TDL(1, 1), TDL(1, 2), . . . , TDL(1, n), TDL(2, 1), . . . , and TDL(m, 1) having changes in mutual capacitance. The detection circuit 40 identifies the electric-field transmission region TDD overlapping with the first electrode COML identified as the one supplied with the first drive signals Vcom1 out of the electric-field transmission regions TDD1, TDD2, TDD3, TDD4, TDD5, and TDD6 included in the identified second electrode TDL. The detection circuit 40 then outputs the coordinates of the electric-field transmission region TDD as the position of the target object.

Even if the area covering the first electrodes COML is increased by increasing the area of the second electrodes TDL in planar view, the detection device according to the first embodiment can output the position of the target object.

As illustrated in FIG. 15, in hover detection, the second electrodes TDL(1, 1), . . . , TDL(1, n), . . . , TDL(m, 1), . . . , and TDL(m, n), for example, serve as detection electrodes for hover detection. As illustrated in FIG. 16, the second electrodes TDL(1, 1), . . . , TDL(1, n), . . . , TDL(m, 1), . . . , and TDL(m, n) each have an area overlapping with a plurality of first electrodes COML. Accordingly, the second electrodes TDL have a larger area, thereby increasing detection sensitivity in hover detection.

In the present disclosure, the second electrodes TDL are arrayed in a row-column configuration in the active area 10a. In other words, the second electrodes TDL are arrayed in the first direction Dx and the second direction Dy.

As described above, in touch detection (mutual capacitance method), the detection device drives the first electrodes COML and detects the position of the target object in the contact state at the positions of the respective electric-field transmission regions TDD in the second electrodes TDL. In hover detection (self-capacitance method), the detection device detects the target object in the non-contact state at the positions of the second electrodes TDL.

Figure 19:
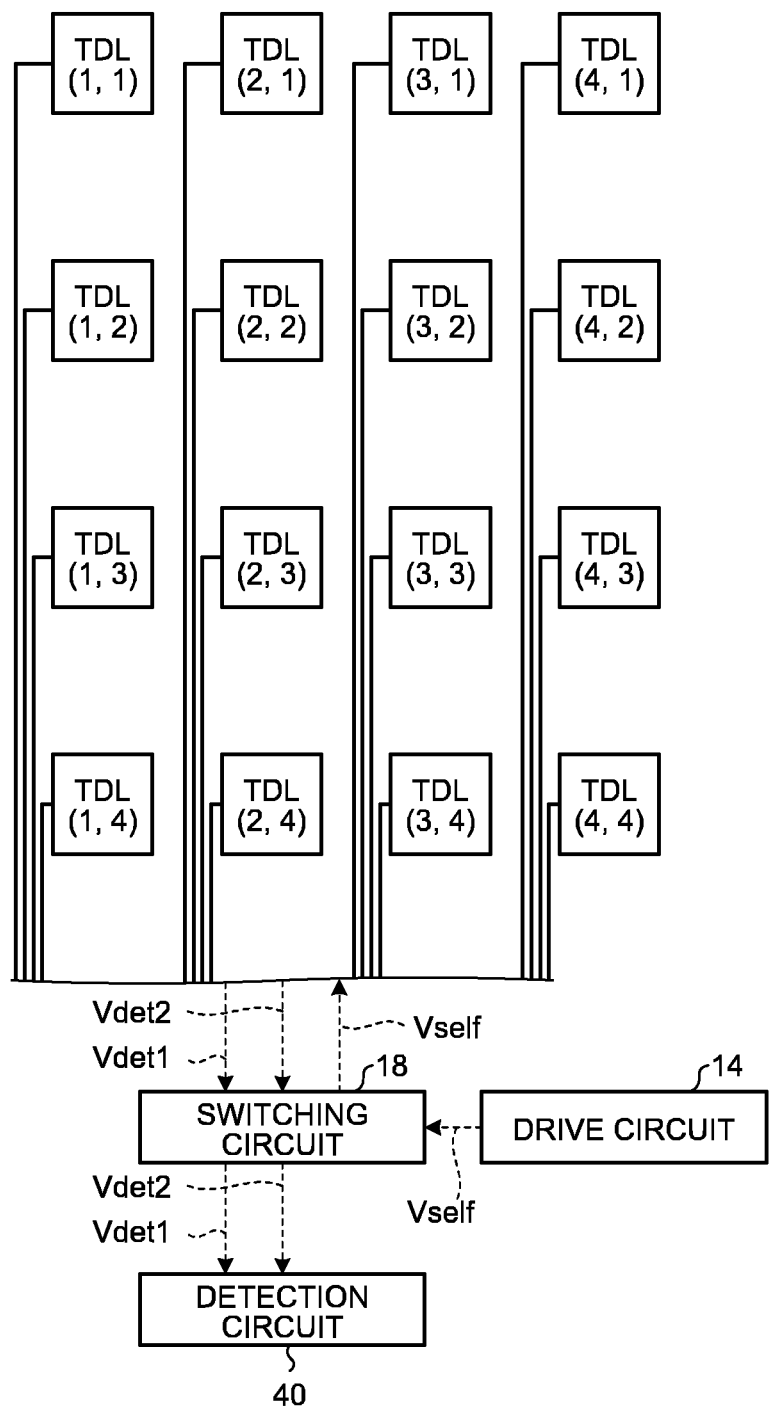
FIG. 19 is a diagram for explaining a first coupling state of the second electrodes in touch detection and a second coupling state of the second electrodes in hover detection.

FIG. 19 is a diagram for explaining a first coupling state of the second electrodes in touch detection and a second coupling state of the second electrodes in hover detection. To simplify the explanation, FIG. 19 illustrates a configuration where the second electrodes TDL are arrayed in four rows and four columns. The configuration according to the present disclosure is not limited to the second electrodes TDL in four rows and four columns, and the embodiment may be applicable to the second electrodes TDL in m rows and n columns. As illustrated in FIG. 1, in touch detection, the drive circuit 14 sequentially drives the first electrodes COML in the active area 10a. As illustrated in FIG. 19, the second electrodes TDL(1, 1), TDL(1, 2), TDL(1, 3), TDL(1, 4), TDL(2, 1), TDL(2, 2), TDL(2, 3), TDL(2, 4), TDL(3, 1), TDL(3, 2), TDL(3, 3), TDL(3, 4), TDL(2, 1), TDL(2, 2), TDL(2, 3), and TDL(2, 4) output the first detection signals Vdet1 to the detection circuit 40 via the switching circuit 18.

In hover detection, the drive circuit 14 illustrated in FIG. 19 sequentially or simultaneously supplies the second drive signals Vself to the second electrodes TDL via the switching circuit 18. In other words, the drive circuit 14 collectively drives a plurality of second electrodes TDL. The second electrodes TDL output, to the detection circuit 40 via the switching circuit 18, the second detection signals Vdet2 corresponding to capacitance changes in the respective second electrodes TDL.

In accordance with the second detection signals Vdet2, the detection circuit 40 performs hover detection by the self-capacitance method described above. The detection circuit 40 can detect the position and a movement, such as a gesture, of the target object in the non-contact state in accordance with the second detection signals Vdet2 supplied from the second electrodes TDL in the active area 10a.

Figure 20:
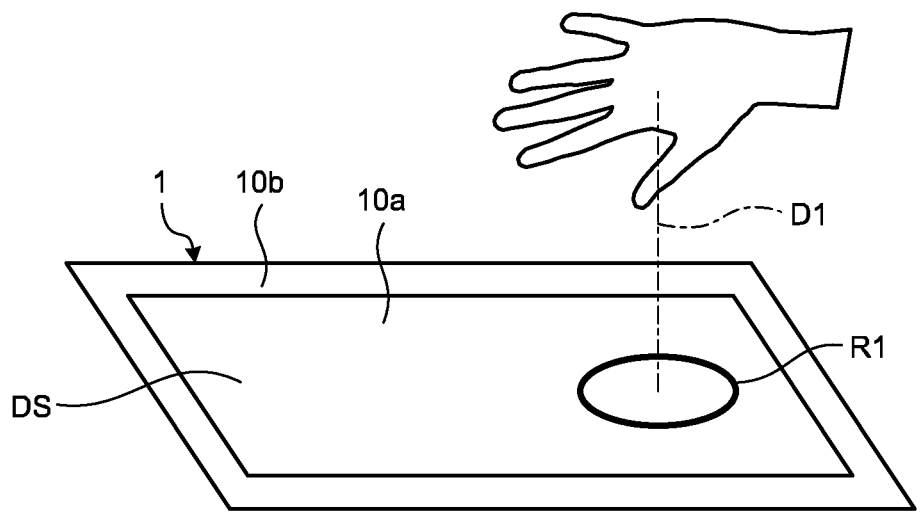
FIG. 20 is a diagram for explaining an example of hover detection according to the present embodiment.
Figure 21:
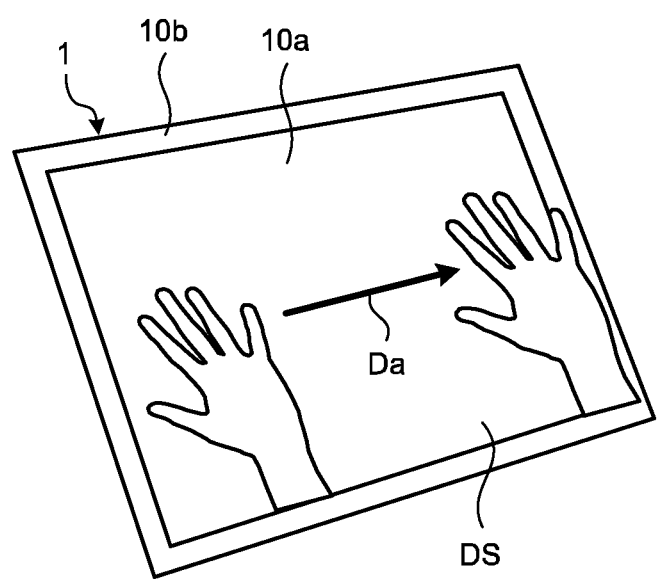
FIG. 21 is a diagram for explaining another example of hover detection according to the present embodiment.

FIG. 20 is a diagram for explaining an example of hover detection according to the present embodiment. FIG. 21 is a diagram for explaining another example of hover detection according to the present embodiment. As illustrated in FIG. 20, the display device 1 performs hover detection when a finger of an operator serving as the target object is in the non-contact state with respect to the detection surface DS. The detection circuit 40 can detect a distance D1 between the detection surface DS and the target object in a direction perpendicular to the detection surface DS in accordance with the second detection signals Vdet2. The detection circuit 40 can also detect a position R1 of the target object in accordance with the second detection signals Vdet2. The position R1 of the target object faces the target object in the direction perpendicular to the detection surface DS, for example, and corresponds to the second electrode TDL having the largest value of the second detection signals Vdet2 supplied from the second electrodes TDL.

As illustrated in FIG. 21, the display device 1 can also detect a movement, such as a gesture, of the target object. When the target object in the non-contact state with respect to the detection surface DS moves in the direction of the arrow Da, the detection circuit 40 calculates the change in position of the target object in accordance with the second detection signals Vdet2. The detection circuit 40 thus detects a movement, such as a gesture, of the target object. Based on results of hover detection, the control circuit 11 (refer to FIG. 1) performs a predetermined display operation or detection operation.

As described above, the second electrodes TDL each serve as one detection electrode in self-capacitance hover detection. In hover detection, the drive circuit 14 supplies guard signals Vgd to the first electrodes COML. The first electrodes COML are driven at the same electric potential as that of the second electrodes TDL. This mechanism can reduce parasitic capacitance between the second electrodes TDL and the first electrodes COML, thereby increasing detection accuracy in hover detection. In other words, the first electrodes COML serve as guard electrodes in hover detection.

Figure 22:
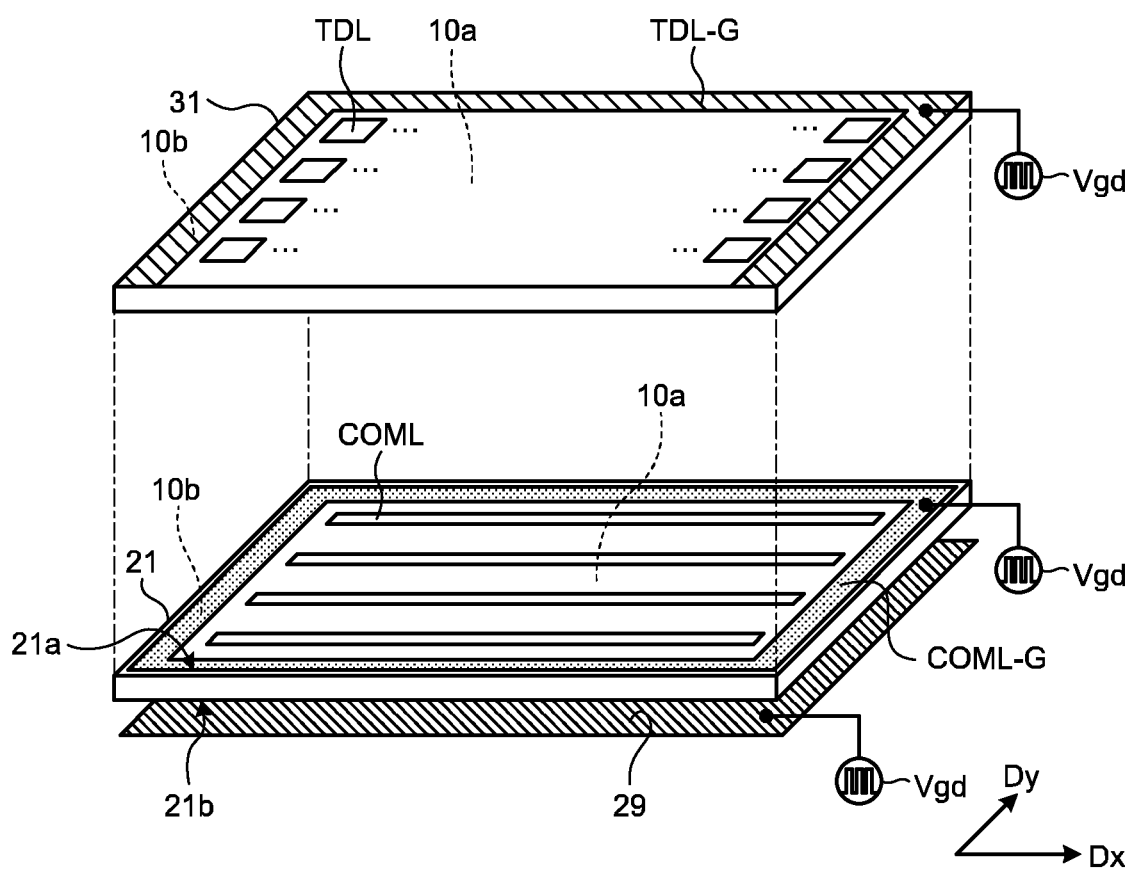
FIG. 22 is a perspective view illustrating exemplary arrangement of the second electrodes and the first electrodes.

FIG. 22 is a perspective view illustrating exemplary arrangement of the second electrodes and the first electrodes. As described above, when the display device 1 performs self-capacitance hover detection, the outer edge wires TDL-G are supplied with the guard signals Vgd having the same waveform as that of the second drive signals Vself for detection and synchronized with the second drive signals Vself. As described above, in hover detection, the drive circuit 14 supplies the guard signals Vgd to the outer edge wires TDL-G. The guard signal Vgd is a voltage signal synchronized with the second drive signal Vself and having the same electric potential as that of the second drive signal Vself. This mechanism can reduce parasitic capacitance in the second electrodes TDL, thereby increasing detection accuracy. Instead of being supplied with the guard signals Vgd, the outer edge wires TDL-G may be brought into a state of not being electrically coupled to any component (high impedance state).

The first electrodes COML are provided in the active area 10a on a first surface 21a of the first substrate 21. The first surface 21a, for example, is opposite to a second surface 21b.

As illustrated in FIG. 22, the peripheral region 10b on the first surface 21a of the first substrate 21 is provided with outer edge wires COML-G. The outer edge wires COML-G, for example, are continuous along the long sides and the short sides of the active area 10a to surround the active area 10a. When the display device 1 performs self-capacitance hover detection, the outer edge wires COML-G may be supplied with the guard signals Vgd having the same waveform as that of the second drive signals Vself for detection and synchronized with the second drive signals Vself. Alternatively, the outer edge wires COML-G may be brought into a state of not being electrically coupled to any component (high impedance state). This mechanism can prevent generation of capacitance between the outer edge wires COML-G and the first electrodes COML supplied with the second drive signals Vself, thereby increasing sensitivity in hover detection.

The present embodiment may include outer edge wires 29 on the second surface 21b of the first substrate 21 illustrated in FIG. 22. The outer edge wires 29 on the rear surface may cover part of the second surface 21b of the first substrate 21 or the entire second surface 21b. The outer edge wires 29 on the rear surface may be made of a translucent conductive material, such as ITO, or may be a metal frame, which is not illustrated, for example. When the display device 1 performs self-capacitance hover detection, the outer edge wires 29 on the rear surface may be supplied with the guard signals Vgd having the same waveform as that of the second drive signals Vself for detection and synchronized with the second drive signals Vself. Alternatively, the outer edge wires 29 on the rear surface may be brought into a state of not being electrically coupled to any component (high impedance state). This mechanism can prevent generation of capacitance between the outer edge wires 29 on the rear surface and the first electrodes COML supplied with the second drive signals Vself, thereby increasing sensitivity in hover detection.

As described above, the second electrodes TDL serve not only as detection electrodes in mutual capacitance touch detection but also as detection electrodes in self-capacitance hover detection. One second electrode TDL according to the present embodiment has a larger area. With this configuration, the lines of electric force of an electric field generated from the second electrode TDL reach a position away from the detection surface DS. Accordingly, the display device 1 can perform accurate touch detection and desirable hover detection using the second electrodes TDL both in touch detection and hover detection.

The second electrodes TDL according to the present embodiment are provided to the second substrate 31. This configuration can make a space between the second electrodes TDL and various kinds of circuits, such as the switching elements Tr, the first scanner 12A, and the second scanner 12B, and various kinds of wiring, such as the signal lines SGL and the gate lines GCL larger than that in a case where the second electrodes TDL are provided to the first substrate 21. Accordingly, the present embodiment can reduce parasitic capacitance formed between the second electrodes TDL and the various kinds of circuits and wiring, thereby accurately performing hover detection.

As described above, the detection device in the sensor region 30 includes at least the first substrate 21, the first electrodes COML, and the second electrodes TDL. The first electrodes COML extend in the first direction Dx of the first substrate 21 and are arrayed in the second direction Dy intersecting the first direction Dx. The second electrodes TDL are arrayed in at least the first direction in a layer different from that of the first electrodes COML. One second electrode TDL partially overlaps with a plurality of first electrodes COML in planar view and has the electric-field transmission regions TDD, in which an electric field can pass through the second electrode TDL in the direction perpendicular to the first substrate 21. One electric-field transmission region TDD in one second electrode TDL overlaps with one first electrode COML in planar view. Even if the area of the second electrodes TDL is increased in planar view, the fringe electric field passing through the second electrodes TDL is less likely to be reduced, thereby enabling touch detection. As a result, the detection device in the sensor region can perform touch detection and hover detection using the same second electrodes TDL.

Figure 23:
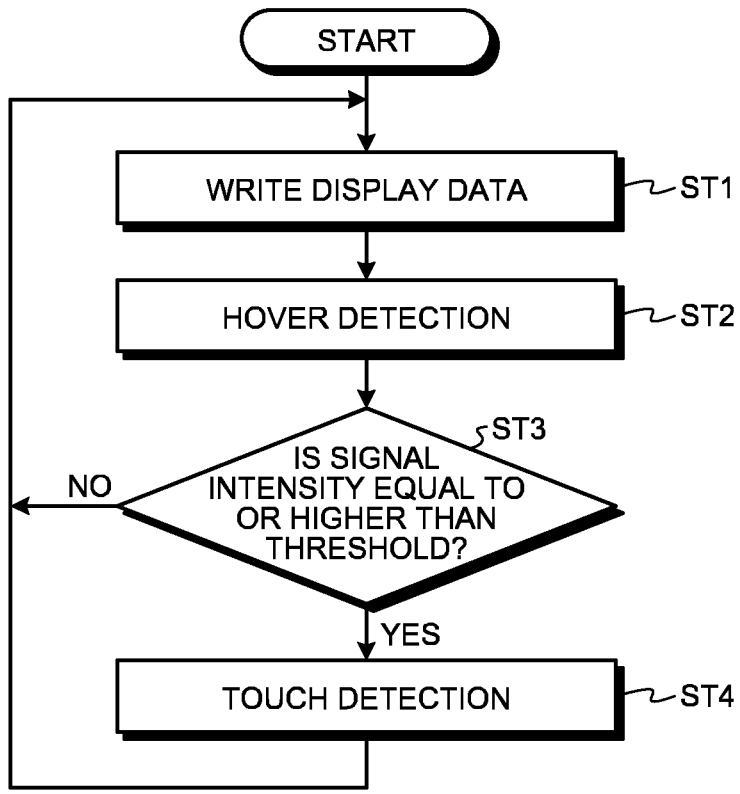
FIG. 23 is a flowchart for an exemplary operation performed by the display device according to the present embodiment.
Figure 24:
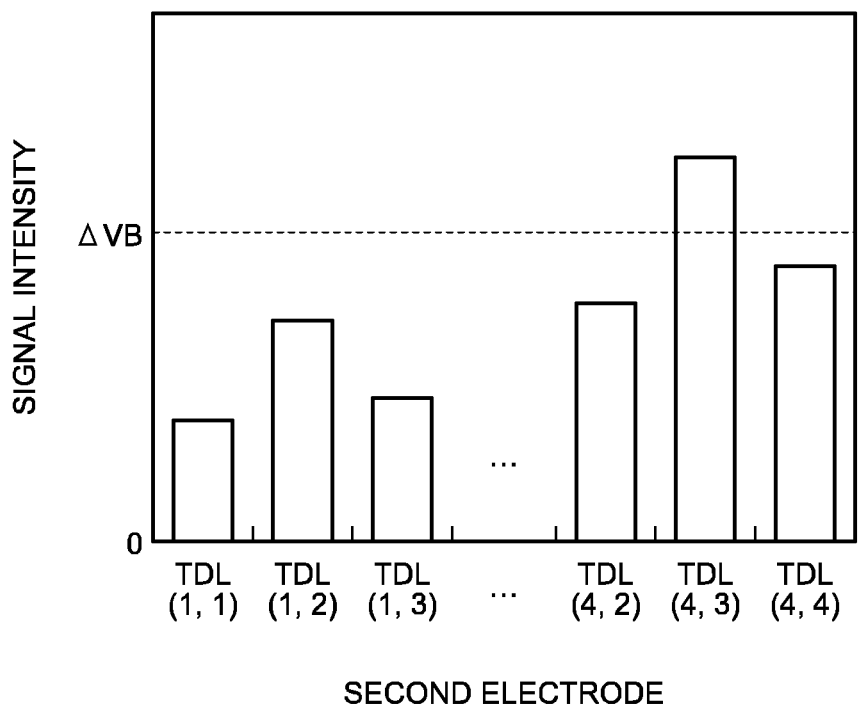
FIG. 24 is a graph schematically illustrating a relation between the second electrodes and signal intensities.
Figure 25:
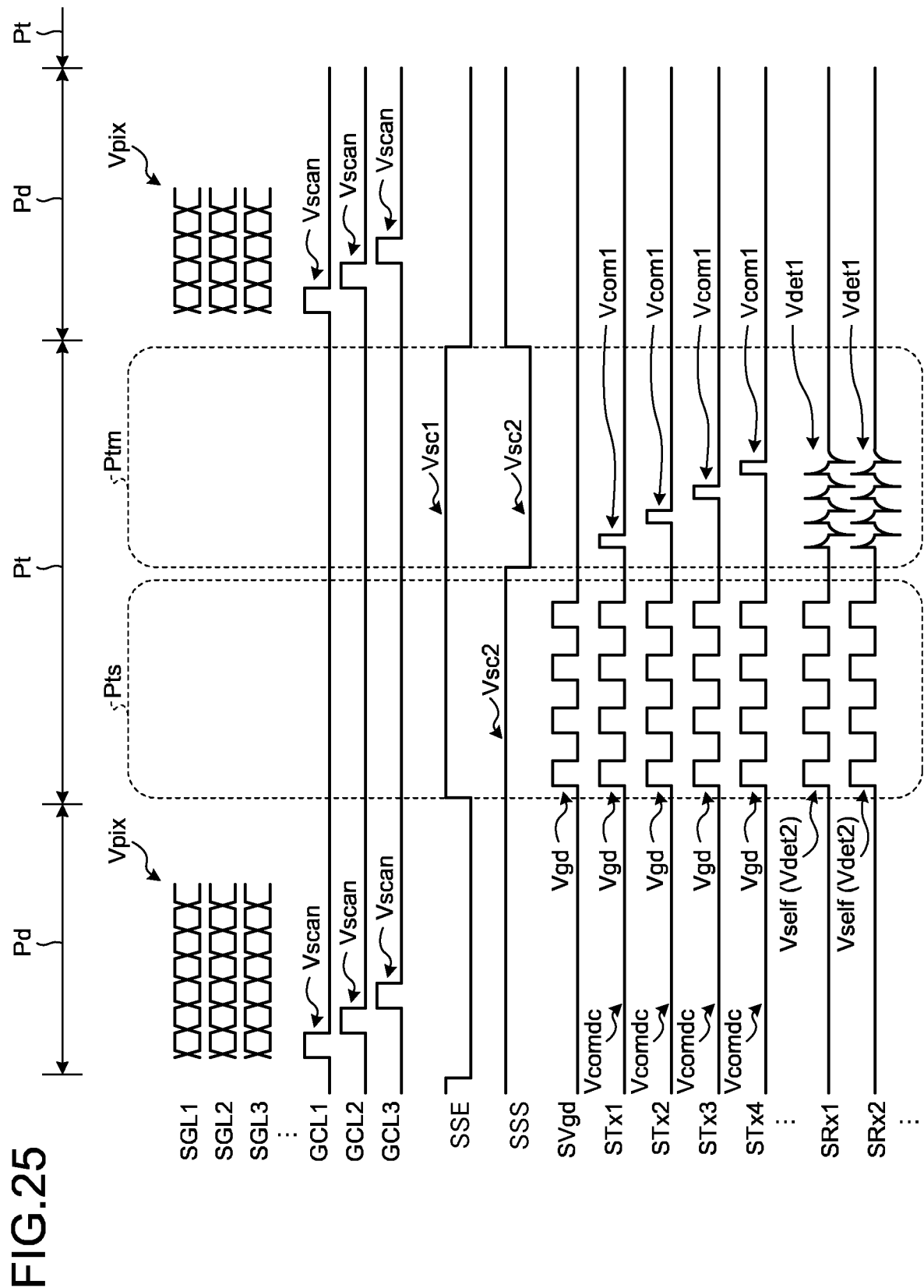
FIG. 25 is a timing waveform chart for an exemplary operation performed by the display device according to the present embodiment.

The following describes an exemplary operation according to the present embodiment with reference to FIG. 1 and FIGS. 23 to 25. FIG. 23 is a flowchart for an exemplary operation performed by the display device according to the present embodiment. FIG. 24 is a graph schematically illustrating a relation between the second electrodes and signal intensities. FIG. 25 is a timing waveform chart for an exemplary operation performed by the display device according to the present embodiment. The exemplary operation illustrated in FIGS. 23 to 25 is given by way of example only and may be appropriately modified.

As illustrated in FIG. 25, display periods Pd and detection periods Pt are alternately arranged in a time-division manner. The detection period Pt includes a hover detection period Pts and a touch detection period Ptm. The execution order of the display period Pd, the hover detection period Pts, and the touch detection period Ptm is given by way of example only and may be appropriately modified. For example, one detection period Pt may include only one of the hover detection period Pts and the touch detection period Ptm. The display device 1 may perform touch detection on one detection surface in one touch detection period Ptm or a plurality of touch detection periods Ptm in a divided manner. The display device 1 may display an image of one frame in one display period Pd. Alternatively, within a period for displaying an image of one frame, a plurality of display periods Pd and a plurality of detection periods Pt may be provided such that each of the display periods Pd and each of the detection periods Pt are alternately arranged.

As illustrated in FIG. 23, the control circuit 11 writes display data first (Step ST1). Specifically, similarly to the display operation described above, the source driver 13 supplies the pixel signals Vpix to the sub-pixels SPix corresponding to gate lines GCL1, GCL2, and GCL3 via signal lines SGL1 SGL2, and SGL3. The sub-pixels SPix perform display on a one horizontal line-by-one horizontal line basis in accordance with the supplied pixel signals Vpix. As illustrated in FIG. 25, the drive circuit 14 supplies the drive signals Vcomdc for display to the first electrodes COML in the display period Pd.

Subsequently, the control circuit 11 performs hover detection (Step ST2). Specifically, as illustrated in FIG. 25, the control circuit 11 supplies the control signal Vsc1 to the switching circuit 18 via a signal line SSE and supplies the control signal Vsc2 to the switching circuit 18 via a signal line SSS in the hover detection period Pts. The control signal Vsc1 is a signal for operating the detection device. The control signal Vsc2 is a signal for selecting between the self-capacitance method and the mutual capacitance method to operate the detection device. In the hover detection period Pts, the detection device in the sensor region 30 operates by the self-capacitance method.

In the hover detection period Pts, as illustrated in FIG. 19, the drive circuit 14 supplies the second drive signals Vself to the second electrodes TDL. A wire SRx1 is electrically coupled to the wire 37 of the second electrode TDL(1, 1), and a wire SRx2 is electrically coupled to the wire 37 of the second electrode TDL(2, 1). A wire SRx3 and the other wires SRx, which are not illustrated, are electrically coupled to the wires 37 of the respective second electrodes TDL other than the second electrodes TDL(1, 1) and TDL(1, 2). With this configuration, the display device 1 can detect the target object in the non-contact state in units of a plurality of second electrodes TDL disposed side by side in the first direction Dx and the second direction Dy. The detection circuit 40, for example, can detect the distance D1 between the detection surface DS and the target object in the direction perpendicular to the detection surface DS based on the second detection signals Vdet2 supplied from the respective second electrodes TDL. The detection circuit 40 can also detect the position R1 of the target object in accordance with the second detection signals Vdet2 supplied from the respective second electrodes TDL. The drive circuit 14 supplies the guard signals Vgd to wires STx1, STx2, STx3, STx4, . . . coupled to the respective first electrodes COML in the hover detection period Pts.

Subsequently, the detection circuit 40 determines whether the second detection signals Vdet2 supplied from the respective second electrodes TDL are equal to or higher than a predetermined threshold $\Delta$VB (Step ST3). As illustrated in FIG. 24, the detection circuit 40 calculates the signal intensities of the second detection signals Vdet2 supplied from the respective second electrodes TDL and compares them with the predetermined threshold $\Delta$VB.

If the signal intensity of any one of the second detection signals Vdet2 is equal to or higher than the threshold $\Delta$VB (Yes at Step ST3), the control circuit 11 performs touch detection (Step ST4). If the signal intensity of the second detection signal Vdet2 is equal to or higher than the threshold $\Delta$VB, the detection circuit 40 determines that the target object is in the contact state. In the example illustrated in FIG. 24, the signal intensity of the second detection signal Vdet2 supplied from the second electrode TDL(4,3) is equal to or higher than the threshold $\Delta$VB. The signal intensities of the second detection signals Vdet2 supplied from the other second electrodes TDL are lower than the threshold $\Delta$VB. In this case, the detection circuit 40 determines that the target object is in the contact state at a position corresponding to the second electrode TDL(4, 3). The control circuit 11 switches from hover detection to touch detection based on the information supplied from the detection circuit 40.

Specifically, as illustrated in FIG. 25, the control circuit 11 supplies the control signal Vsc1 to the switching circuit 18 and supplies the control signal Vsc2 to the switching circuit 18 in the touch detection period Ptm. Consequently, the detection device in the sensor region 30 operates by the mutual capacitance method.

The drive circuit 14 sequentially supplies the first drive signals Vcom1 to the wires STx1, STx2, STx3, STx4, . . . coupled to the respective first electrodes COML. The first detection signals Vdet1 corresponding to changes in capacitance between the second electrodes TDL and the first electrodes COML are supplied from the respective second electrodes TDL to the detection circuit 40 via the wires SRx1, SRx2, . . . at each of the positions of the electric-field transmission regions TDD in the second electrodes TDL. With this configuration, the display device 1 can detect the target object in the contact state at each of the positions of the electric-field transmission regions TDD in the second electrodes TDL.

In the touch detection period Ptm, when the detection operation on one detection surface is completed, that is, when the control circuit 11 has sequentially supplied the first drive signals Vcom1 to all the second electrodes TDL to perform touch detection, the control circuit 11 terminates touch detection and returns to writing of display data (Step ST1).

If the signal intensities of all the second detection signals Vdet2 are lower than the threshold $\Delta$VB (No at Step ST3), the control circuit 11 does not perform touch detection and returns to writing of display data (Step ST1). In this case, in the detection period Pt illustrated in FIG. 25, the control circuit 11 performs only the processing of the hover detection period Pts and does not perform the processing of the touch detection period Ptm. In other words, only the hover detection period Pts is present in one detection period Pt.

In the hover detection period Pts and the touch detection period Ptm, the signal lines SGL are preferably in a floating state, which is not illustrated in FIG. 25. This mechanism can reduce capacitance between the second electrodes TDL and the signal lines SGL. The gate lines GCL may be in a floating state in the hover detection period Pts.

The exemplary operation illustrated in FIGS. 23 to 25 is given by way of example only and may be appropriately modified. The display device 1, for example, may perform hover detection while changing the number of second electrodes TDL included in one detection electrode in a plurality of hover detection periods Pts. Two second electrodes TDL disposed side by side in the first direction Dx and two second electrodes TDL disposed side by side in the second direction Dy may be electrically coupled to one another by the switching circuit 18 to serve as one detection electrode. As described above, one second electrode TDL may include two or more second electrodes TDL disposed side by side in the first direction Dx and two or more second electrodes TDL disposed side by side in the second direction Dy. Alternatively, one second electrode TDL may include three or more second electrodes TDL disposed side by side in the first direction Dx and three or more second electrodes TDL disposed side by side in the second direction Dy. For example, all the second electrodes TDL in the active area 10a may be electrically coupled by the switching circuit 18 to serve as one second electrode TDL. The control circuit 11 can change the resolution in hover detection by changing the number of second electrodes TDL included in one detection electrode depending on the distance D1 between the detection surface DS and the target object.

As described above, the detection device in the sensor region 30 can desirably perform touch detection and hover detection.

In one second electrode TDL, the positions of the electric-field transmission regions TDD1, TDD2, TDD3, TDD4, TDD5, and the TDD6 do not overlap with one another. With this configuration, the detection circuit 40 can identify the second electrode TDL having changes in mutual capacitance out of the second electrodes TDL and identify the electric-field transmission region TDD overlapping with the first electrode COML supplied with the first drive signals Vcom1. Accordingly, the detection circuit 40 can use the position of the electric-field transmission region TDD identified in the first direction Dx and the second direction Dy as the coordinates of the target object. With this configuration, even if the area of the second electrodes TDL in planar view is increased, the detection device according to the first embodiment can increase detection sensitivity in touch detection. As a result, increasing the area of the second electrodes TDL in planar view can increase detection sensitivity in hover detection.

Therefore, the display device 1 according to the present embodiment can desirably perform touch detection and hover detection using the second electrodes TDL both in touch detection and hover detection.

Second Embodiment

Figure 26:
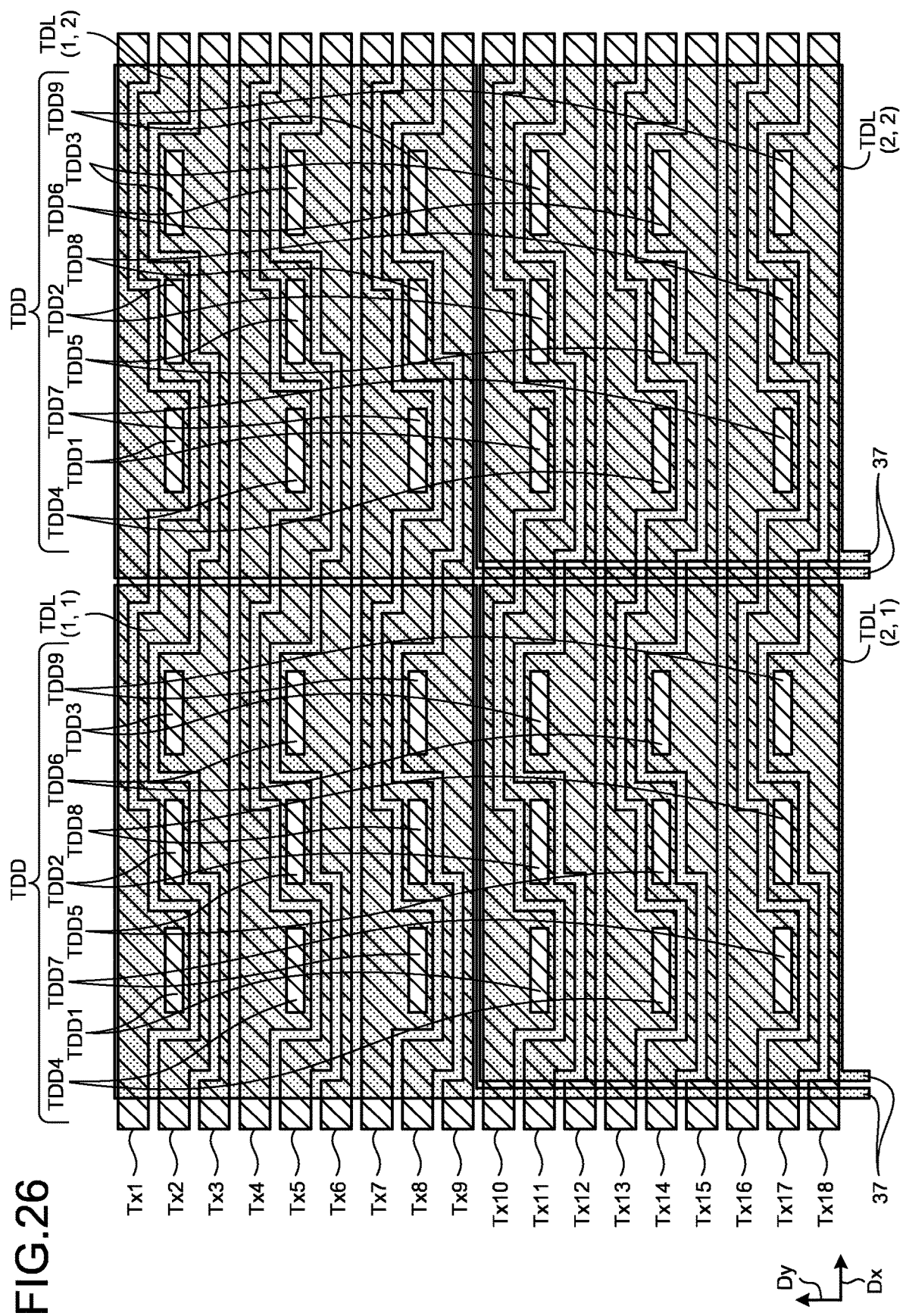
FIG. 26 is a schematic diagram for explaining a relation between the electric-field transmission regions and the first electrodes according to a second embodiment of the present disclosure.
Figure 27:
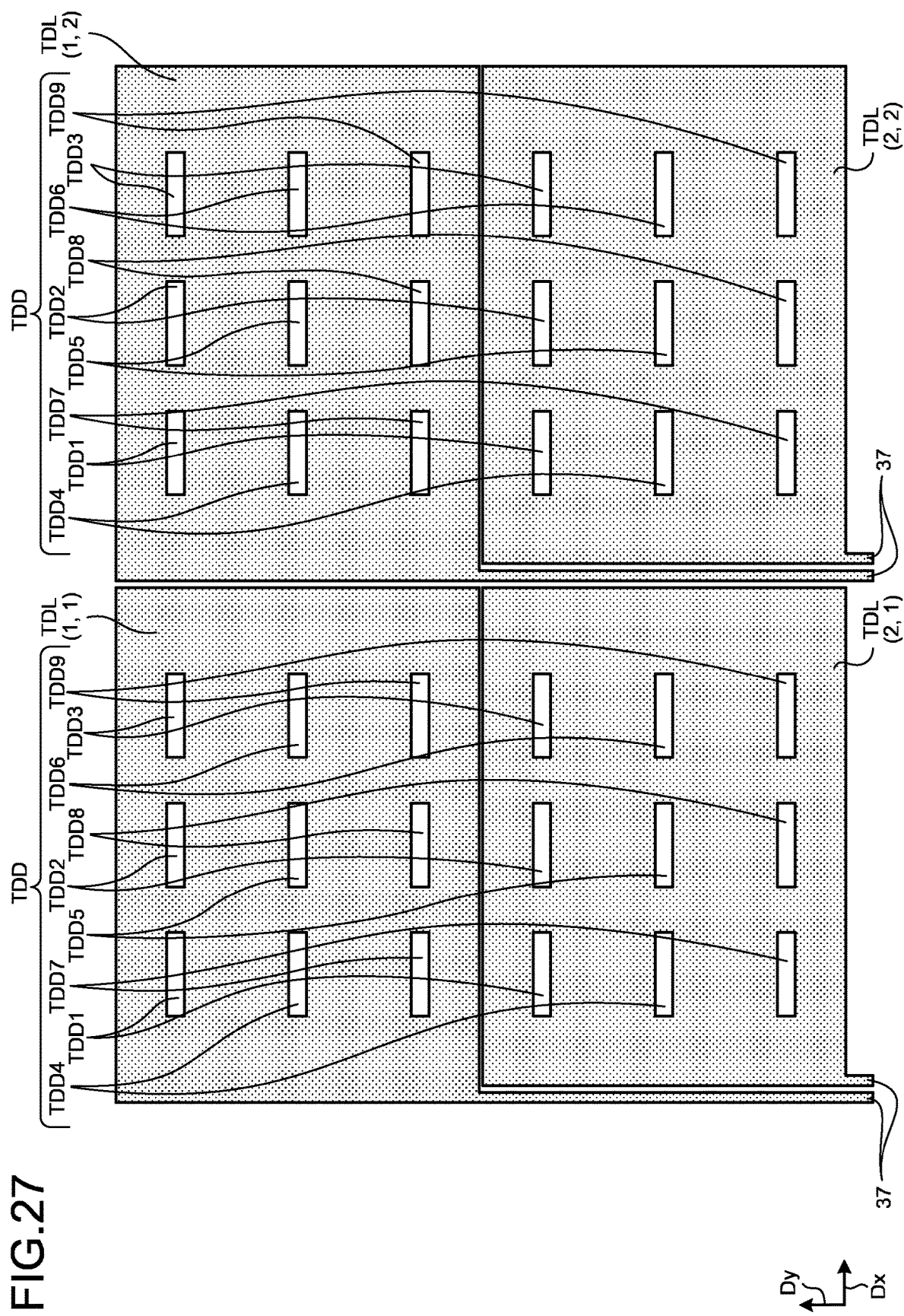
FIG. 27 is a schematic diagram illustrating the second electrodes according to the second embodiment.
Figure 28:
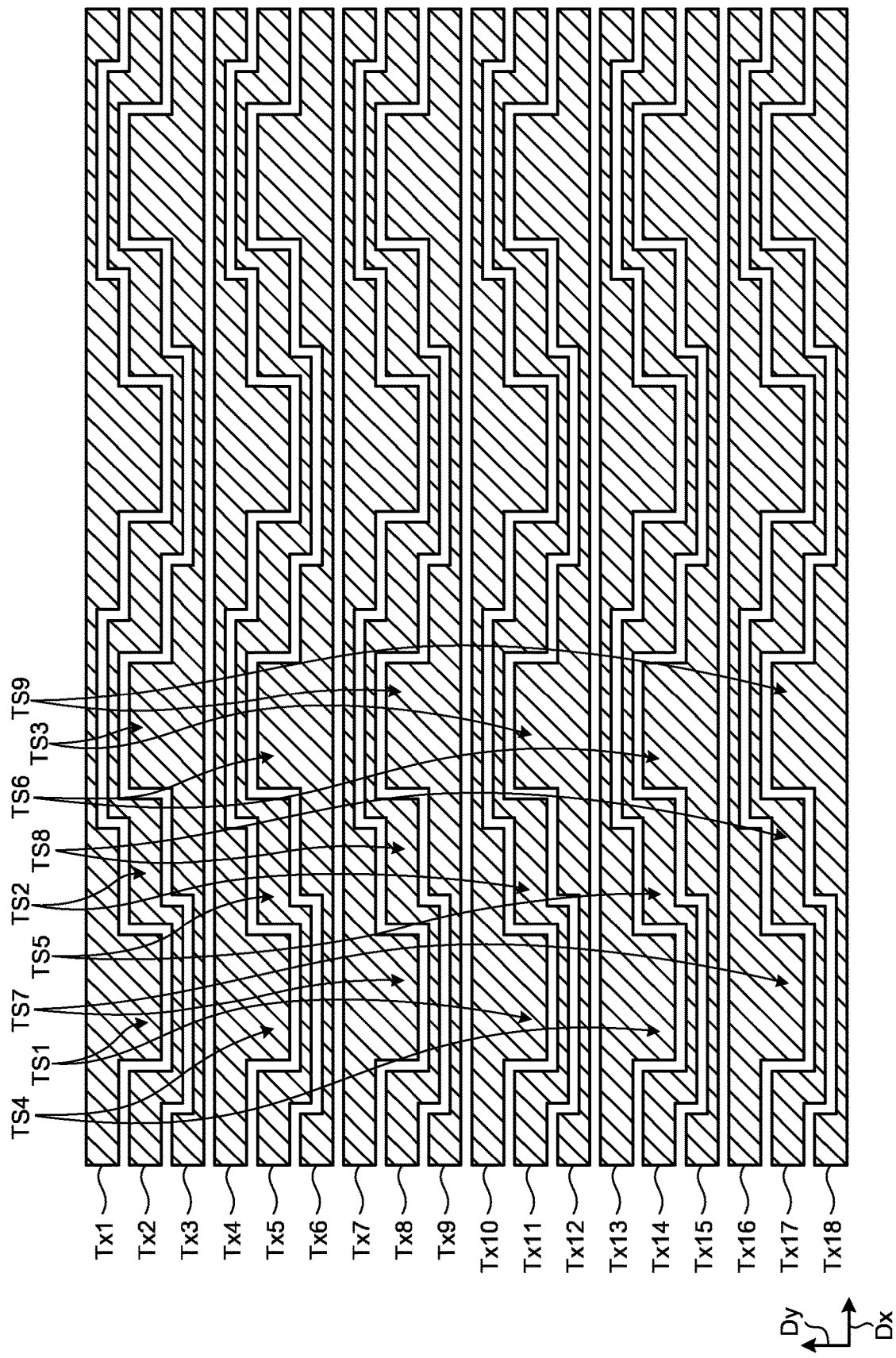
FIG. 28 is a schematic diagram illustrating the first electrodes according to the second embodiment.

FIG. 26 is a schematic diagram for explaining a relation between the electric-field transmission regions and the first electrodes according to a second embodiment of the present disclosure. FIG. 27 is a schematic diagram illustrating the second electrodes according to the second embodiment. FIG. 28 is a schematic diagram illustrating the first electrodes according to the second embodiment. Components described in the first embodiment are denoted by like reference numerals, and explanation thereof is omitted.

The first electrodes COML according to the first embodiment are strip electrodes extending linearly. By contrast, the first electrodes COML according to the second embodiment extend in the first direction Dx as a whole, but are partially bent.

In FIG. 26, the second electrodes TDL illustrated in FIG. 27 overlap with the first electrodes Tx1, . . . , Tx18, . . . illustrated in FIG. 28. As illustrated in FIGS. 26 and 27, the second electrodes TDL(1, 1), TDL(1, 2), TDL(2, 1), and TDL(2, 2) each have the electric-field transmission regions TDD1, TDD2, TDD3, TDD4, TDD5, TDD6, TDD7, TDD8, and TDD9. The electric-field transmission regions TDD1, TDD2, TDD3, TDD4, TDD5, TDD6, TDD7, TDD8, and TDD9 have the same area. FIGS. 26 to 28 illustrate only part of the second electrodes TDL, and the second electrodes TDL(1, 1), . . . , TDL(1, n), . . . , TDL(m, 1), . . . , and TDL(m, n) each have the electric-field transmission regions TDD1, TDD2, TDD3, TDD4, TDD5, TDD6, TDD7, TDD8, and TDD9 in the same manner. The electric-field transmission regions TDD1, TDD2, TDD3, TDD4, TDD5, TDD6, TDD7, TDD8, and TDD9 are simply referred to as the electric-field transmission regions TDD when they need not be distinguished from one another.

As illustrated in FIG. 27, one second electrode TDL has nine electric-field transmission regions TDD inside thereof in planar view. As illustrated in FIG. 27, in one second electrode TDL, the electric-field transmission regions TDD1, TDD2, TDD3, TDD4, TDD5, TDD6, TDD7, TDD8, and TDD9 are disposed at positions not overlapping with one another.

In one second electrode TDL, the positions of the electric-field transmission regions TDD1, TDD2, and TDD3 are different in the first direction Dx but the same in the second direction Dy. The electric-field transmission regions TDD1, TDD2, and TDD3 are disposed side by side in the first direction Dx. In one second electrode TDL, the positions of the electric-field transmission regions TDD4, TDD5, and TDD6 are different in the first direction Dx but the same in the second direction Dy. The electric-field transmission regions TDD4, TDD5, and TDD6 are disposed side by side in the first direction Dx. In one second electrode TDL, the positions of the electric-field transmission regions TDD7, TDD8, and TDD9 are different in the first direction Dx but the same in the second direction Dy. The electric-field transmission regions TDD7, TDD8, and TDD9 are disposed side by side in the first direction Dx.

In one second electrode TDL, the positions of the electric-field transmission regions TDD1, TDD4, and TDD7 are different in the second direction Dy but the same in the first direction Dx. The electric-field transmission regions TDD1, TDD4, and TDD7 are disposed side by side in the second direction Dy. In one second electrode TDL, the positions of the electric-field transmission regions TDD2, TDD5, and TDD8 are different in the second direction Dy but the same in the first direction Dx. The electric-field transmission regions TDD2, TDD5, and TDD8 are disposed side by side in the second direction Dy. In one second electrode TDL, the positions of the electric-field transmission regions TDD3, TDD6, and TDD9 are different in the second direction Dy but the same in the first direction Dx. The electric-field transmission regions TDD3, TDD6, and TDD9 are disposed side by side in the second direction Dy.

As described above, the electric-field transmission regions TDD1, TDD2, TDD3, TDD4, TDD5, TDD6, TDD7, TDD8, and TDD9 are disposed in a row-column configuration in the first direction Dx and the second direction Dy so as not to overlap with one another.

As illustrated in FIG. 28, the first electrodes COML arrayed in the second direction Dy are referred to as the first electrodes Tx1, . . . , Tx18, . . . . The first electrodes Tx1, . . . , and Tx18 are simply referred to as the first electrodes COML as described above when they need not be distinguished from one another. The first electrodes COML extend in the first direction Dx as are whole, but are partially bent.

The first electrodes Tx1 and Tx10 partially have a plurality of wide portions TS1, the width of which in the second direction Dy is larger than that of the other portions. The first electrodes Tx2 and Tx11 partially have a plurality of wide portions TS2, the width of which in the second direction Dy is larger than that of the other portions. The first electrodes Tx3 and Tx12 partially have a plurality of wide portions TS3, the width of which in the second direction Dy is larger than that of the other portions. The first electrodes Tx4 and Tx13 partially have a plurality of wide portions TS4, the width of which in the second direction Dy is larger than that of the other portions. The first electrodes Tx5 and Tx14 partially have a plurality of wide portions TS5, the width of which in the second direction Dy is larger than that of the other portions. The first electrodes Tx6 and Tx15 partially have a plurality of wide portions TS6, the width of which in the second direction Dy is larger than that of the other portions. The first electrodes Tx7 and Tx16 partially have a plurality of wide portions TS7, the width of which in the second direction Dy is larger than that of the other portions. The first electrodes Tx8 and Tx17 partially have a plurality of wide portions TSB, the width of which in the second direction Dy is larger than that of the other portions. The first electrodes Tx9 and Tx18 partially have a plurality of wide portions TS9, the width of which in the second direction Dy is larger than that of the other portions.

The positions of the wide portions TS1, TS2, and TS3 are different in the first direction Dx but the same in the second direction Dy. The wide portions TS1, TS2, and TS3 are disposed side by side in the first direction Dx. The positions of the wide portions TS4, TS5, and TS6 are different in the first direction Dx but the same in the second direction Dy. The wide portions TS4, TS5, and TS6 are disposed side by side in the first direction Dx. The positions of the wide portions TS7, TS8, and TS9 are different in the first direction Dx but the same in the second direction Dy. The wide portions TS7, TS8, and TS9 are disposed side by side in the first direction Dx.

The positions of the wide portions TS1, TS4, and TS7 are different in the second direction Dy but the same in the first direction Dx. The wide portions TS1, TS4, and TS7 are disposed side by side in the second direction Dy. The positions of the wide portions TS2, TS5, and TS8 are different in the second direction Dy but the same in the first direction Dx. The wide portions TS2, TS5, and TS8 are disposed side by side in the second direction Dy. The positions of the wide portions TS3, TS6, and TS9 are different in the second direction Dy but the same in the first direction Dx. The wide portions TS3, TS6, and TS9 are disposed side by side in the second direction Dy.

As described above, the first electrodes COML each include the wide portions that are bent and have the width in the second direction Dy larger than that of the other portions. The wide portions of the first electrodes COML adjacent to each other are disposed side by side in the first direction Dx. As a result, the electric-field transmission regions TDD1, TDD2, TDD3, TDD4, TDD5, TDD6, TDD7, TDD8, and TDD9 illustrated in FIG. 26 overlap with the wide portions TS1, TS2, TS3, TS4, TS5, TS6, TS7, TS8, and TS9, respectively, illustrated in FIG. 28.

As described above, if a touch is detected, the detection circuit 40 calculates the coordinates at which the touch input is performed. In this case, the detection circuit 40 identifies any one of the first electrodes COML out of the first electrodes Tx1, . . . , Tx18, . . . supplied with the first drive signals Vcom1. In the electric-field transmission region TDD in the second electrode TDL overlapping with the identified first electrode COML, the detection circuit 40 detects the target object in contact with the detection surface, in accordance with the first detection signals Vdet1 corresponding to changes in mutual capacitance between the first electrode COML and the second electrode TDL. Specifically, the detection circuit 40 identifies any one of the second electrodes TDL(1, 1), TDL(1, 2), TDL(2, 1), and TDL(2, 2) having changes in mutual capacitance. The detection circuit 40 identifies the electric-field transmission region TDD overlapping with the identified first electrode COML out of the electric-field transmission regions TDD1, TDD2, TDD3, TDD4, TDD5, TDD6, TDD7, TDD8, and TDD9 included in the identified second electrode TDL. The detection circuit 40 outputs the coordinates of the electric-field transmission region TDD as the position of the target object.

In the detection device in the sensor region according to the second embodiment, the electric-field transmission regions TDD1, TDD2, TDD3, TDD4, TDD5, TDD6, TDD7, TDD8, and TDD9 are disposed in a row-column configuration. This configuration can facilitate identification of the position of the target object in the row-column configuration.

Third Embodiment

Figure 29:
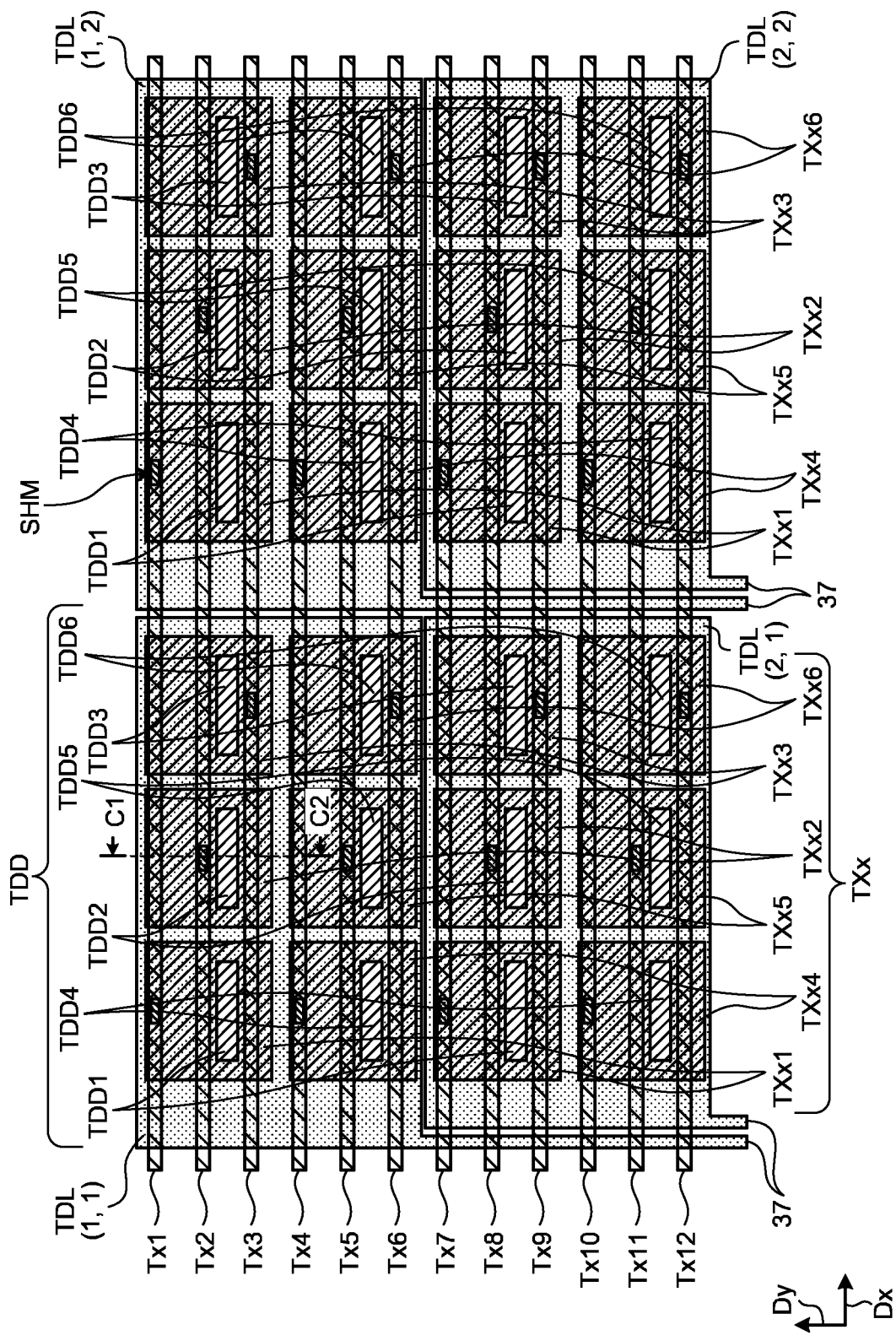
FIG. 29 is a schematic diagram for explaining a relation between the electric-field transmission regions and the first electrodes according to a third embodiment of the present disclosure.
Figure 30:
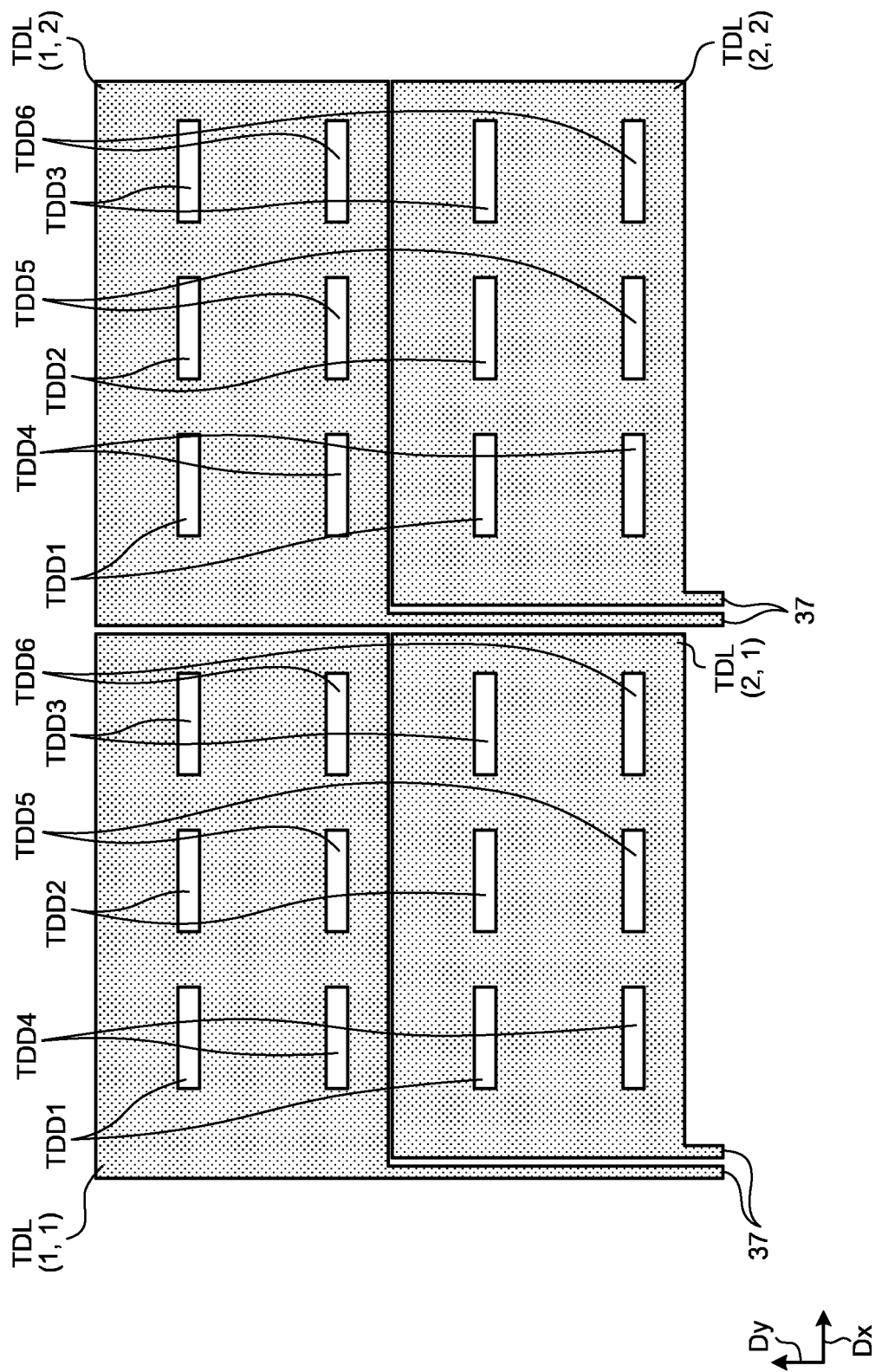
FIG. 30 is a schematic diagram illustrating the second electrodes according to the third embodiment.
Figure 31:
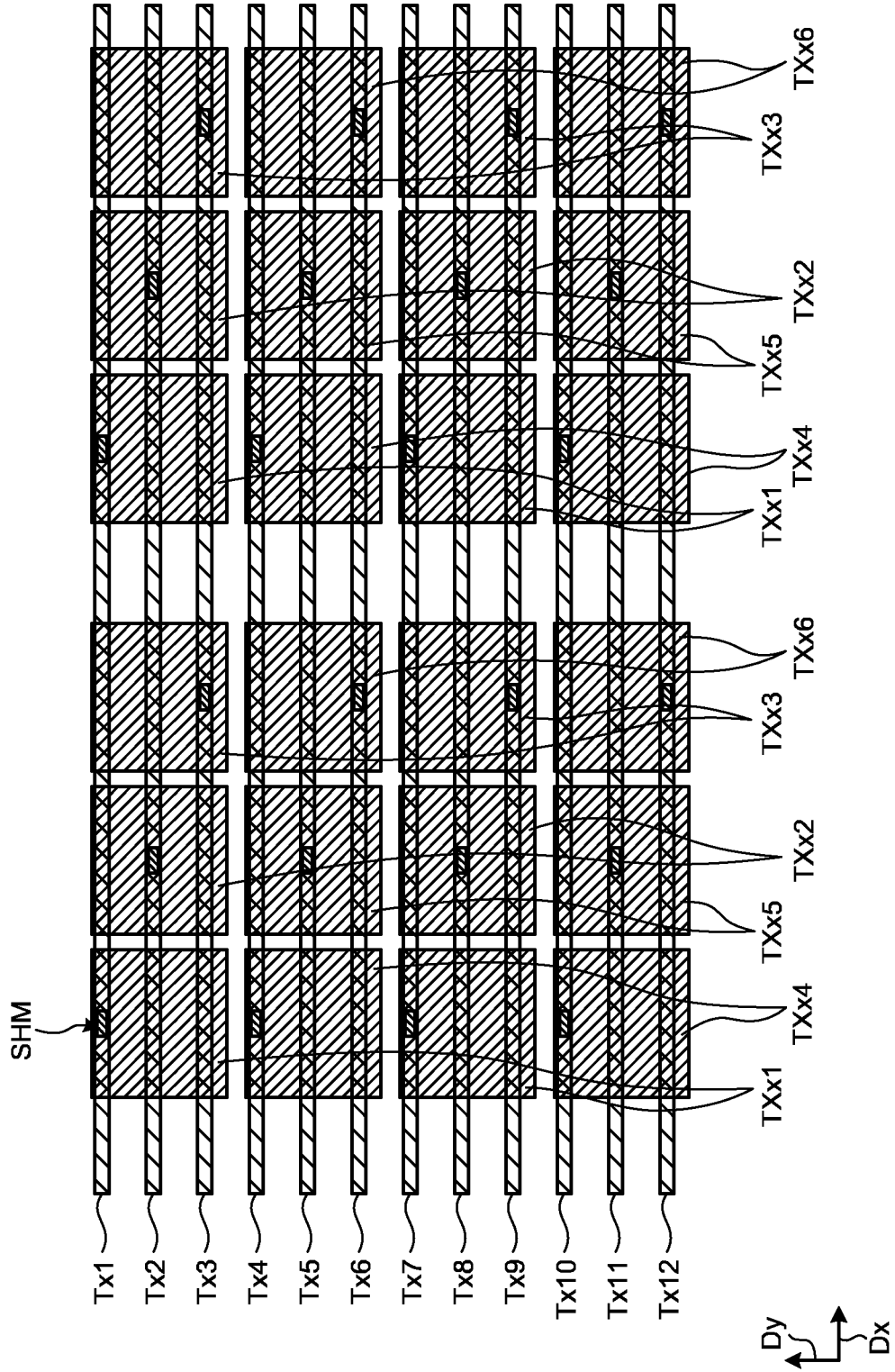
FIG. 31 is a schematic diagram illustrating the first electrodes according to the third embodiment.
Figure 32:
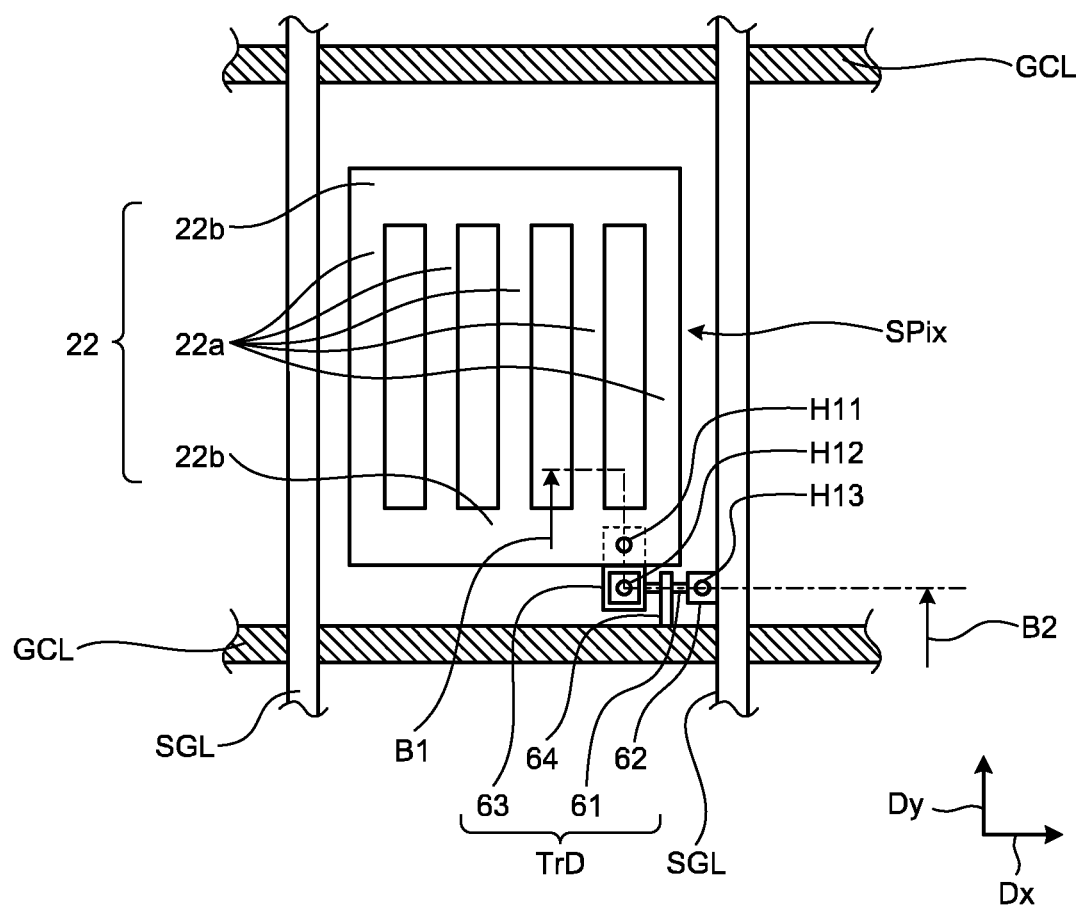
FIG. 32 is a plan view illustrating an exemplary configuration of a sub-pixel.
Figure 33:
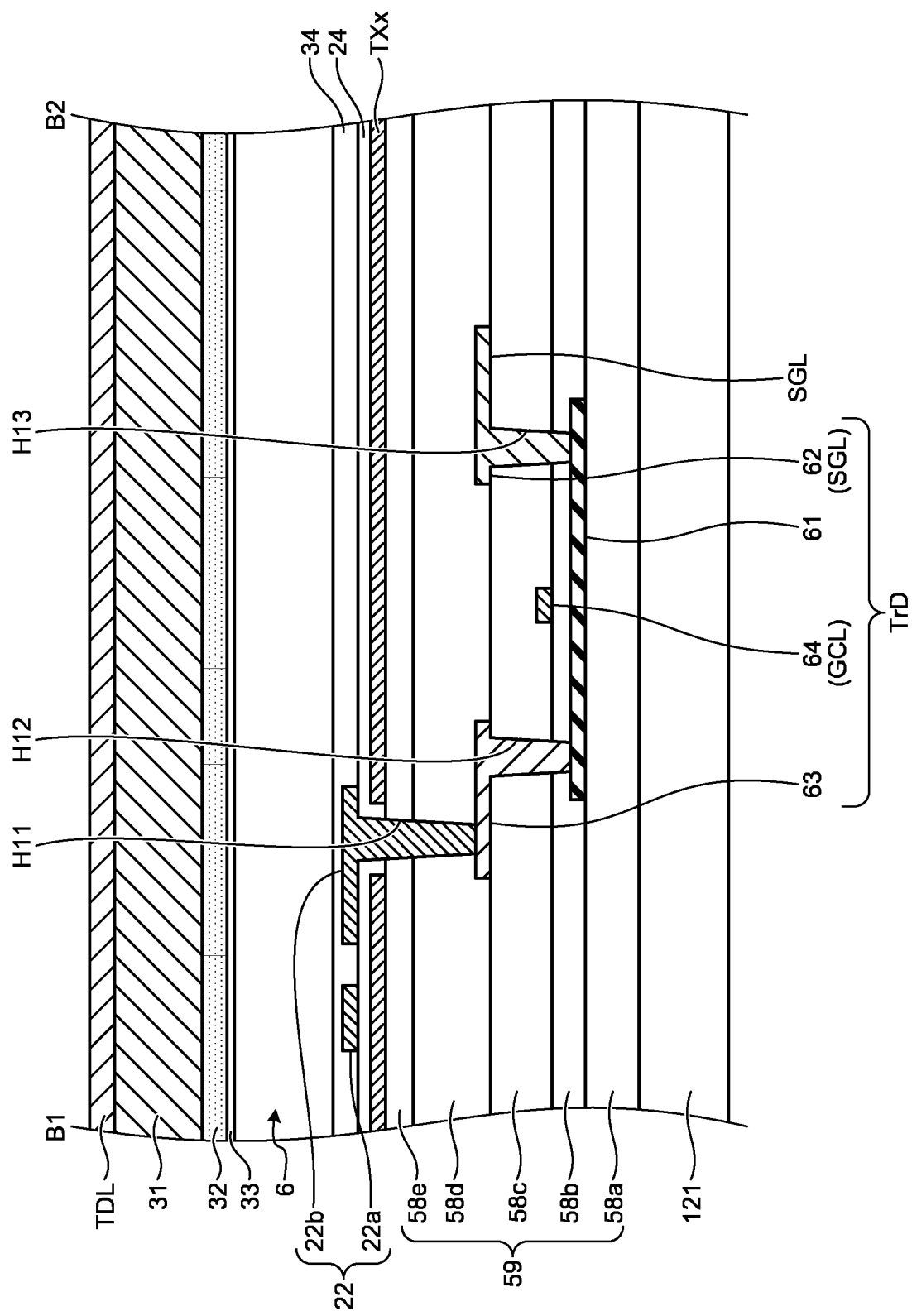
FIG. 33 is a sectional view along line B1-B2 in FIG. 32.
Figure 34:
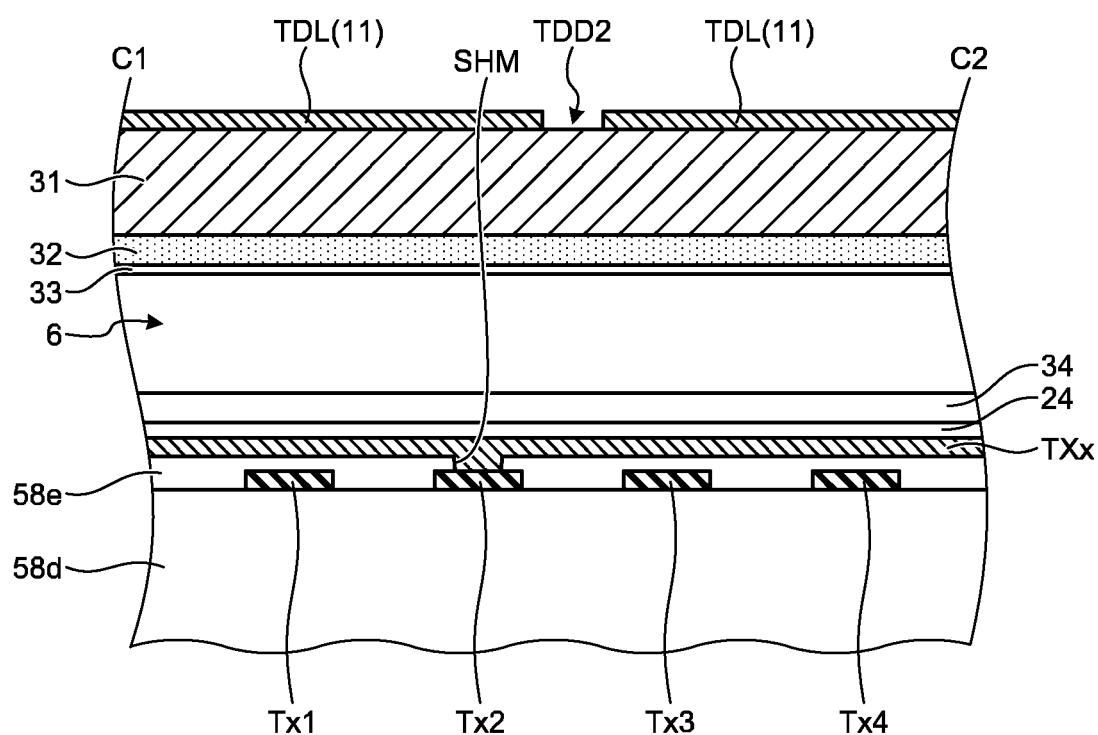
FIG. 34 is a sectional view along line C1-C2 in FIG. 29.

FIG. 29 is a schematic diagram for explaining a relation between the electric-field transmission regions and the first electrodes according to a third embodiment of the present disclosure. FIG. 30 is a schematic diagram illustrating the second electrodes according to the third embodiment. FIG. 31 is a schematic diagram illustrating the first electrodes according to the third embodiment. FIG. 32 is a plan view illustrating an exemplary configuration of a sub-pixel. FIG. 33 is a sectional view along line B1-B2 in FIG. 32. FIG. 34 is a sectional view along line C1-C2 in FIG. 29. Components described in the first and the second embodiments are denoted by like reference numerals, and explanation thereof is omitted.

The first electrodes COML according to the first embodiment are linear electrodes. By contrast, the first electrodes COML according to the third embodiment include: the first electrodes Tx1, . . . , Tx12, . . . , which serve as linear wires extending in the first direction Dx; and a plurality of electrode pieces TXx, which are wider than the first electrodes Tx1, . . . , Tx12, . . . .

In FIG. 29, the second electrodes TDL illustrated in FIG. 30 overlap with the first electrodes Tx1, . . . , Tx12, . . . illustrated in FIG. 31. As illustrated in FIGS. 29 and 30, the second electrodes TDL(1, 1), TDL(1, 2), TDL(2, 1), and TDL(2, 2) each have the electric-field transmission regions TDD1, TDD2, TDD3, TDD4, TDD5, and TDD6. FIGS. 29 to 31 illustrate only part of the second electrodes TDL, and the second electrodes TDL(1, 1), . . . , TDL(1, n), . . . , TDL(m, 1), . . . , and TDL(m, n) each have the electric-field transmission regions TDD1, TDD2, TDD3, TDD4, TDD5, and TDD6 in the same manner. The electric-field transmission regions TDD1, TDD2, TDD3, TDD4, TDD5, and TDD6 are simply referred to as the electric-field transmission regions TDD when they need not be distinguished from one another.

As illustrated in FIG. 30, one second electrode TDL has six electric-field transmission regions TDD inside thereof in planar view. As illustrated in FIG. 30, in one second electrode TDL, the electric-field transmission regions TDD1, TDD2, TDD3, TDD4, TDD5, and TDD6 are disposed at positions not overlapping with one another. The electric-field transmission regions TDD1, TDD2, TDD3, TDD4, TDD5, and TDD6 have the same area.

In one second electrode TDL, the positions of the electric-field transmission regions TDD1, TDD2, and TDD3 are different in the first direction Dx but the same in the second direction Dy. The electric-field transmission regions TDD1, TDD2, and TDD3 are disposed side by side in the first direction Dx. In one second electrode TDL, the positions of the electric-field transmission regions TDD4, TDD5, and TDD6 are different in the first direction Dx but the same in the second direction Dy. The electric-field transmission regions TDD4, TDD5, and TDD6 are disposed side by side in the first direction Dx.

In one second electrode TDL, the positions of the electric-field transmission regions TDD1 and TDD4 are different in the second direction Dy but the same in the first direction Dx. The electric-field transmission regions TDD1 and TDD4 are disposed side by side in the second direction Dy. In one second electrode TDL, the positions of the electric-field transmission regions TDD2 and TDD5 are different in the second direction Dy but the same in the first direction Dx. The electric-field transmission regions TDD2 and TDD5 are disposed side by side in the second direction Dy. In one second electrode TDL, the positions of the electric-field transmission regions TDD3 and TDD6 are different in the second direction Dy but the same in the first direction Dx. The electric-field transmission regions TDD3 and TDD6 are disposed side by side in the second direction Dy.

As described above, the electric-field transmission regions TDD1, TDD2, TDD3, TDD4, TDD5, and TDD6 are disposed in a row-column configuration in the first direction Dx and the second direction Dy so as not to overlap with one another.

As illustrated in FIG. 31, the first electrodes COML arrayed in the second direction Dy are referred to as the first electrodes Tx1, . . . , Tx12, . . . . The first electrodes Tx1, ..., and Tx12, ... are simply referred to as the first electrodes COML as described above when they need not be distinguished from one another. The first electrodes COML extend in the first direction Dx.

As illustrated in FIG. 29, one second electrode TDL overlaps with electrode pieces TXx1, TXx2, TXx3, TXx4, TXx5, and TXx6 in planar view. The electrode pieces TXx1, TXx2, TXx3, TXx4, TXx5, and TXx6 are disposed in a row-column configuration in the first direction Dx and the second direction Dy so as not to overlap with one another. The electrode pieces TXx1, TXx2, TXx3, TXx4, TXx5, and TXx6 each have a rectangular shape.

The positions of the electrode pieces TXx1, TXx2, and TXx3 are different in the first direction Dx but the same in the second direction Dy. The electrode pieces TXx1, TXx2, and TXx3 are disposed side by side in the first direction Dx. The positions of the electrode pieces TXx4, TXx5, and TXx6 are different in the first direction Dx but the same in the second direction Dy. The electrode pieces TXx4, TXx5, and TXx6 are disposed side by side in the first direction Dx.

The positions of the electrode pieces TXx1 and TXx4 are different in the second direction Dy but the same in the first direction Dx. The electrode pieces TXx1 and TXx4 are disposed side by side in the second direction Dy. The positions of the electrode pieces TXx2 and TXx5 are different in the second direction Dy but the same in the first direction Dx. The electrode pieces TXx2 and TXx5 are disposed side by side in the second direction Dy. The positions of the electrode pieces TXx3 and TXx6 are different in the second direction Dy but the same in the first direction Dx. The electrode pieces TXx3 and TXx6 are disposed side by side in the second direction Dy.

As illustrated in FIG. 29, any one of the electric-field transmission regions TDD1, TDD2, TDD3, TDD4, TDD5, and TDD6 overlap with any one of the electrode pieces TXx1, TXx2, TXx3, TXx4, TXx5, and TXx6.

The following describes electric coupling between the first electrodes COML and the electrode pieces TXx1, TXx2, TXx3, TXx4, TXx5, and TXx6 with reference to FIGS. 29 to 34.

The first substrate 21 illustrated in FIG. 33 is provided with switching elements TrD of respective sub-pixels SPix and wiring, such as the data lines SGL and the gate lines GCL, as illustrated in FIG. 32. The data lines SGL supply the pixel signals Vpix to the pixel electrodes 22, and the gate lines GCL supply drive signals for driving the switching elements TrD. The data lines SGL and the gate lines GCL extend on a plane parallel to the surface of the first substrate 21.

The display region 20 illustrated in FIG. 14 includes a plurality of sub-pixels SPix arrayed in a row-column configuration. The sub-pixels SPix each include the switching element TrD illustrated in FIG. 32. The switching element TrD is a thin-film transistor and is an n-channel metal oxide semiconductor (MOS) TFT in this example. The source of the switching element TrD is coupled to the data line SGL, the gate thereof is coupled to the gate line GCL, and the drain thereof is coupled to one end of the liquid crystal element 6a illustrated in FIG. 14. The other end of the liquid crystal element 6a illustrated in FIG. 14 is coupled to the first electrode COML. The insulating layer 24 (refer to FIG. 12) is provided between the pixel electrodes 22 and the first electrodes COML to form the holding capacitance 6b illustrated in FIG. 14.

The sub-pixel SPix is coupled to the other sub-pixels SPix belonging to the same row in the display region 20 by the gate line GCL. The gate lines GCL are coupled to the gate driver 12 (refer to FIG. 1) and supplied with the scanning signals Vscan from the gate driver 12. The sub-pixel SPix is coupled to the other sub-pixels SPix belonging to the same column in the display region 20 by the data line SGL. The data lines SGL are coupled to the source driver 13 (refer to FIG. 1) and supplied with the pixel signals Vpix from the source driver 13. The electrode pieces TXx of the first electrodes COML are coupled to the drive circuit 14 (refer to FIG. 1) and supplied with the drive signals Vcomdc for display or the first drive signals Vcom1 for detection from the drive circuit 14. The electrode pieces TXx are made of a translucent conductive material, such as ITO.

As illustrated in FIG. 32, a region surrounded by the gate lines GCL and the data lines SGL corresponds to one sub-pixel SPix. The sub-pixel SPix includes a region in which the pixel electrode 22 overlaps with the first electrode COML. A plurality of pixel electrodes 22 are coupled to the data line SGL via the respective switching elements TrD.

As illustrated in FIG. 33, the pixel electrode 22 includes a plurality of strip electrodes 22a and connections 22b. The strip electrodes 22a extend along the data lines SGL and are arrayed in a direction along the gate lines GCL. The connections 22b each connect the ends of the strip electrodes 22a. While the pixel electrode 22 includes five strip electrodes 22a, the present disclosure is not limited thereto. The pixel electrode 22 may include four or less or six or more strip electrodes 22a. The pixel electrode 22 may include two strip electrodes 22a, for example.

As illustrated in FIG. 33, the switching element TrD includes a semiconductor layer 61, a source electrode 62, a drain electrode 63, and a gate electrode 64.

As illustrated in FIG. 33, an insulating layer 58a is provided on a substrate 121. The semiconductor layer 61 is provided on the insulating layer 58a. The gate electrode 64 (gate line GCL) is provided above the semiconductor layer 61 with an insulating layer 58b interposed therebetween. The drain electrode 63 and the source electrode 62 (data line SGL) are provided above the gate electrode 64 (gate line GCL) with an insulating layer 58c interposed therebetween. The first electrode COML is provided above the drain electrode 63 and the source electrode 62 (data line SGL) with an insulating layer 58d interposed therebetween. As described above, the pixel electrode 22 is provided above the first electrode COML with the insulating layer 24 interposed therebetween. An orientation film 34 is provided on the pixel electrode 22. An orientation film 33 is provided on the opposite side of the orientation film 34 across the liquid crystal layer 6.

As illustrated in FIGS. 32 and 33, the pixel electrode 22 is coupled to the drain electrode 63 of the switching element TrD through a contact hole H11. The semiconductor layer 61 is coupled to the drain electrode 63 through a contact hole H12. The semiconductor layer 61 intersects the gate electrode 64 in planar view. The gate electrode 64 is coupled to the gate line GCL and protrudes from one side of the gate line GCL. The semiconductor layer 61 extends to a position overlapping with the source electrode 62, and is electrically coupled to the source electrode 62 through a contact hole H13. The source electrode 62 is coupled to the data line SGL and protrudes from one side of the data line SGL.

As illustrated in FIG. 34, the first electrodes Tx1, ..., and Tx4 are provided on the insulating layer 58d and covered with an insulating layer 58e. The first electrodes Tx1, ..., and Tx4 are metal layers made of one or more of aluminum (Al), copper (Cu), silver (Ag), molybdenum (Mo), chromium (Cr), and tungsten (W). As illustrated in FIG. 31, the electrode piece TXx is electrically coupled to any one of the first electrodes Tx1, ..., Tx12, ... through a contact hole SHM. As illustrated in FIG. 34, for example, the electrode piece TXx2 is electrically coupled to the first electrode Tx2 through the contact hole SHM.

With the configuration described above, as illustrated in FIG. 31, the electrode piece TXx1 is electrically coupled to any one of the first electrodes Tx1 and Tx7 through the contact hole SHM. The electrode piece TXx2 is electrically coupled to any one of the first electrodes Tx2 and Tx8 through the contact hole SHM. The electrode piece TXx3 is electrically coupled to any one of the first electrodes Tx3 and Tx9 through the contact hole SHM. The electrode piece TXx4 is electrically coupled to any one of the first electrodes Tx4 and Tx10 through the contact hole SHM. The electrode piece TXx5 is electrically coupled to any one of the first electrodes Tx5 and Tx11 through the contact hole SHM. The electrode piece TXx6 is electrically coupled to any one of the first electrodes Tx6 and Tx12 through the contact hole SHM.

As described above, if a touch is detected, the detection circuit 40 calculates the coordinates at which the touch input is performed. In this case, the detection circuit 40 identifies any one of the first electrodes COML out of the first electrodes Tx1, ..., Tx12, ... supplied with the first drive signals Vcom1. In the electric-field transmission region TDD in the second electrode TDL overlapping with the identified first electrode COML, the detection circuit 40 detects the target object in contact with the detection surface, in accordance with the first detection signals Vdet1 corresponding to changes in mutual capacitance between the first electrode COML and the second electrode TDL. Specifically, the detection circuit 40 identifies any one of the second electrodes TDL(1, 1), TDL(1, 2), TDL(2, 1), and TDL(2, 2) having changes in mutual capacitance. The detection circuit 40 identifies the electric-field transmission region TDD overlapping with the identified first electrode COML out of the electric-field transmission regions TDD1, TDD2, TDD3, TDD4, TDD5, and TDD6 included in the identified second electrode TDL. The detection circuit 40 outputs the coordinates of the electric-field transmission region TDD as the position of the target object.

In the detection device in the sensor region according to the third embodiment, the electric-field transmission regions TDD1, TDD2, TDD3, TDD4, TDD5, and TDD6 are disposed in a row-column configuration. This configuration can facilitate identification of the position of the target object in the row-column configuration.

Fourth Embodiment

Figure 35:
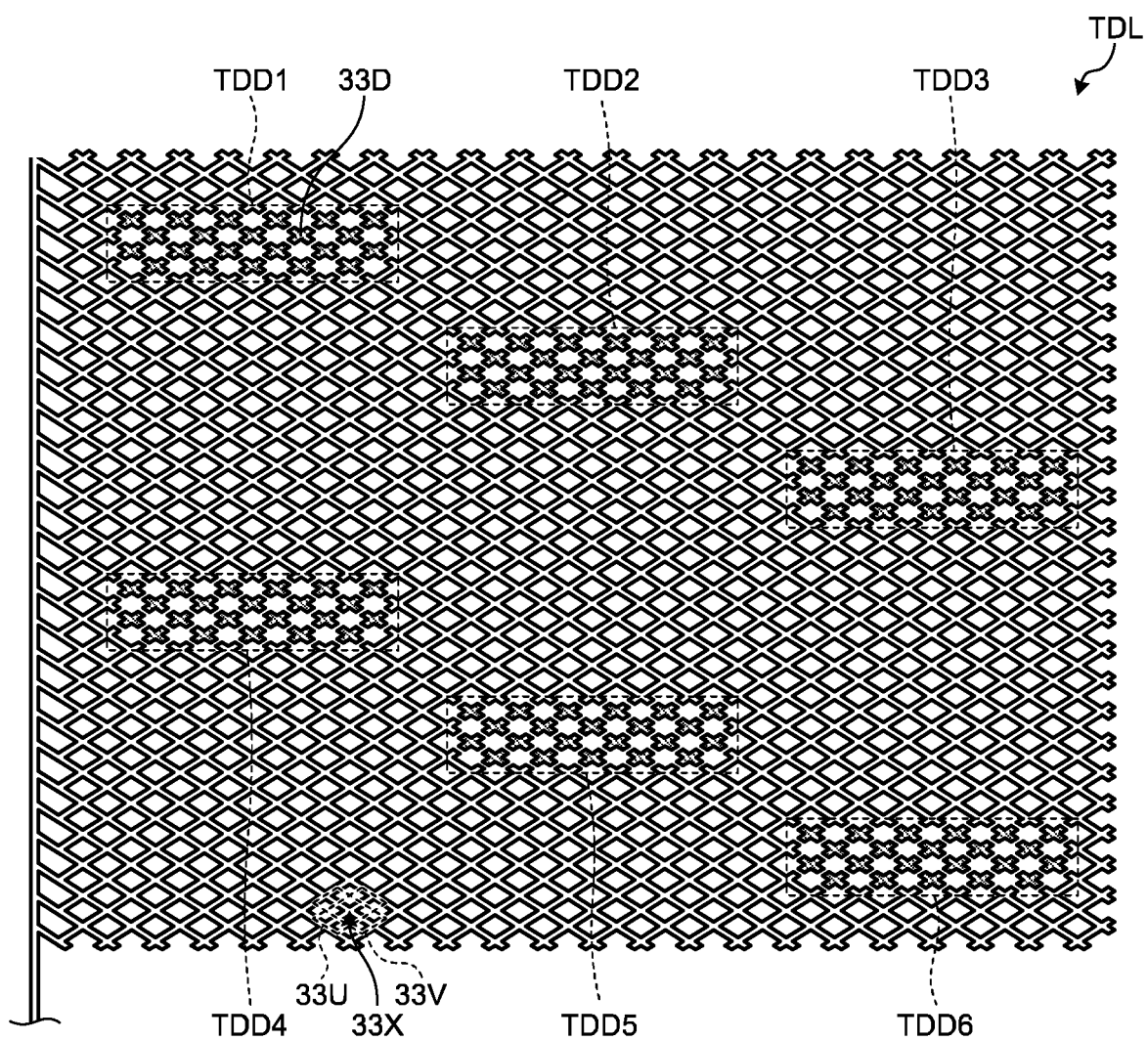
FIG. 35 is a schematic diagram illustrating the second electrode according to a fourth embodiment of the present disclosure.

FIG. 35 is a schematic diagram illustrating the second electrode according to a fourth embodiment of the present disclosure. Components described in the first to the third embodiments are denoted by like reference numerals, and explanation thereof is omitted.

The second electrode TDL according to the fourth embodiment includes at least one first conductive thin wire 33U and at least one second conductive thin wire 33V intersecting the first conductive thin wire 33U. The first conductive thin wire 33U and the second conductive thin wire 33V are electrically coupled to each other at a coupling portion 33X. A plurality of first conductive thin wires 33U intersect a plurality of second conductive thin wires 33V at a plurality of intersections to have a mesh-like shape. With this structure, one mesh of the second electrode TDL has a parallelogram shape. The first conductive thin wire 33U and the second conductive thin wire 33V are inclined in mutually opposite directions with respect to a direction parallel to the first direction Dx.

While the second electrode TDL includes the first conductive thin wires 33U and the second conductive thin wires 33V, the area of the second electrode TDL according to the present disclosure includes the area of openings surrounded by the first conductive thin wires 33U and the second conductive thin wires 33V in addition to the area of the first conductive thin wires 33U and the second conductive thin wires 33V. In other words, the area of the second electrode TDL corresponds to the area of a substantially rectangular region surrounding the first conductive thin wires 33U and the second conductive thin wires 33V.

The first conductive thin wires 33U and the second conductive thin wires 33V each have a small width. In the active area 10a illustrated in FIG. 22, the first conductive thin wires 33U are disposed with a space interposed therebetween in the second direction Dy. The second conductive thin wires 33V are disposed with a space interposed therebetween in the second direction Dy.

First ends in the extending directions of the first conductive thin wires 33U and the second conductive thin wires 33V are coupled to the coupling wire 37. The coupling wire 37 passes between the second electrodes TDL facing each other in the first direction Dx; extends from the active area 10a; and is coupled to the flexible substrate 72 provided in the peripheral region 10b (refer to FIG. 15). With this configuration, the first conductive thin wires 33U and the second conductive thin wires 33V are electrically coupled to each other to serve as one second electrode TDL. One second electrode TDL according to the present embodiment is coupled to one coupling wire 37. The second electrode TDL has a substantially rectangular shape. The shape of the second electrode TDL is not limited thereto, and may be another shape, such as a square, polygonal, or elliptic shape.

The first conductive thin wires 33U and the second conductive thin wires 33V are metal layers made of one or more of Al, Cu, Ag, Mo, Cr, and W. Alternatively, the first conductive thin wires 33U and the second conductive thin wires 33V are made of an alloy including one or more of the metal materials described above. The first conductive thin wires 33U and the second conductive thin wires 33V may be multilayered bodies including a plurality of conductive layers made of the metal materials described above or an alloy including one or more of the materials. The first conductive thin wires 33U and the second conductive thin wires 33V may be multilayered bodies including conductive layers made of translucent conductive oxide, such as ITO. Alternatively, the first conductive thin wires 33U and the second conductive thin wires 33V may be multilayered bodies including blackened films, black organic films, or black conductive organic films obtained by combining the metal materials and the conductive layers described above.

The metal materials described above have resistance lower than that of translucent conductive oxide, such as ITO. The metal materials described above have a light-shielding property higher than that of translucent conductive oxide. As a result, the transmittance may be reduced, or the patterns of the second electrodes TDL may be visually recognized. One second electrode TDL according to the present embodiment includes a plurality of first conductive thin wires 33U and a plurality of second conductive thin wires 33V each having a small width. The first conductive thin wires 33U are disposed with a space interposed therebetween, and the second conductive thin wires 33V are disposed with a space interposed therebetween, each space being larger than the width of each of the first conductive thin wire 33U and the second conductive thin wire 33V. This configuration can reduce the resistance and prevent the second electrodes TDL from being visually recognized. As a result, the second electrodes TDL have lower resistance, and the display device 1 can have a smaller thickness, a larger screen, or higher definition.

The width of the first conductive thin wire 33U and the second conductive thin wire 33V is preferably from 1 μm to 10 μm inclusive and more preferably from 1 μm to 5 μm inclusive. If the first conductive thin wire 33U and the second conductive thin wire 33V each have a width of 10 μm or smaller, the area covering apertures is reduced in the active area 10a, where the apertures correspond to regions in which transmission of light is not suppressed by a black matrix or the gate lines GCL and the signal lines SGL. This lowers the possibility of an aperture ratio loss. If the first conductive thin wire 33U and the second conductive thin wire 33V each have a width of 1 μm or larger, they have a stable shape, and thus are less likely to be disconnected.

The second electrode TDL does not necessarily include mesh-shaped metal thin wires and may include a plurality of zigzag-line-shaped or wavy-line-shaped metal thin wires, for example. Dummy electrodes not serving as detection electrodes may be provided between the second electrodes TDL. The dummy electrode may have a mesh-shaped, zigzag-line-shaped, or wavy-line-shaped pattern similar to that of the second electrode TDL. The electric potential of the dummy electrodes is not fixed.

As illustrated in FIG. 35, the second electrode TDL has the electric-field transmission regions TDD1, TDD2, TDD3, TDD4, TDD5, and TDD6. The electric-field transmission regions TDD1, TDD2, TDD3, TDD4, TDD5, and TDD6 have the same area. The electric-field transmission regions TDD1, TDD2, TDD3, TDD4, TDD5, and TDD6 are each provided with a plurality of dummy electrodes 33D, the electric potential of which is not fixed. The dummy electrodes 33D are not electrically coupled to each other. The dummy electrodes 33D are not electrically coupled to the first conductive thin wires 33U or the second conductive thin wires 33V. As described above, the electric potential of the dummy electrodes 33D is not fixed. With this configuration, the dummy electrodes 33D have a smaller effect of shielding the fringe electric field (FIG. 18) in touch detection. As a result, in touch detection, the lines of electric force of the fringe electric field extend from the first electrode COML; pass through the electric-field transmission regions TDD1, TDD2, TDD3, TDD4, TDD5, and TDD6; and extend toward the second electrode TDL.

The dummy electrode 33D includes a conductive thin wire having the same inclination as that of the first conductive thin wires 33U with respect to the direction parallel to the first direction Dx and a conductive thin wire having the same inclination as that of the second conductive thin wires 33V with respect to the direction parallel to the first direction Dx. This structure prevents the electric-field transmission regions TDD1, TDD2, TDD3, TDD4, TDD5, and TDD6 from being visually recognized with respect to the first conductive thin wires 33U and the second conductive thin wires 33V.

The length of the electric-field transmission regions TDD1, TDD2, TDD3, TDD4, TDD5, and TDD6 in the first direction Dx is longer than that in the second direction Dy. With this structure, the electric-field transmission regions TDD1, TDD2, TDD3, TDD4, TDD5, and TDD6 overlap with the respective first electrodes COML extending in the first direction Dx in planar view.

First Modification

Figure 36:
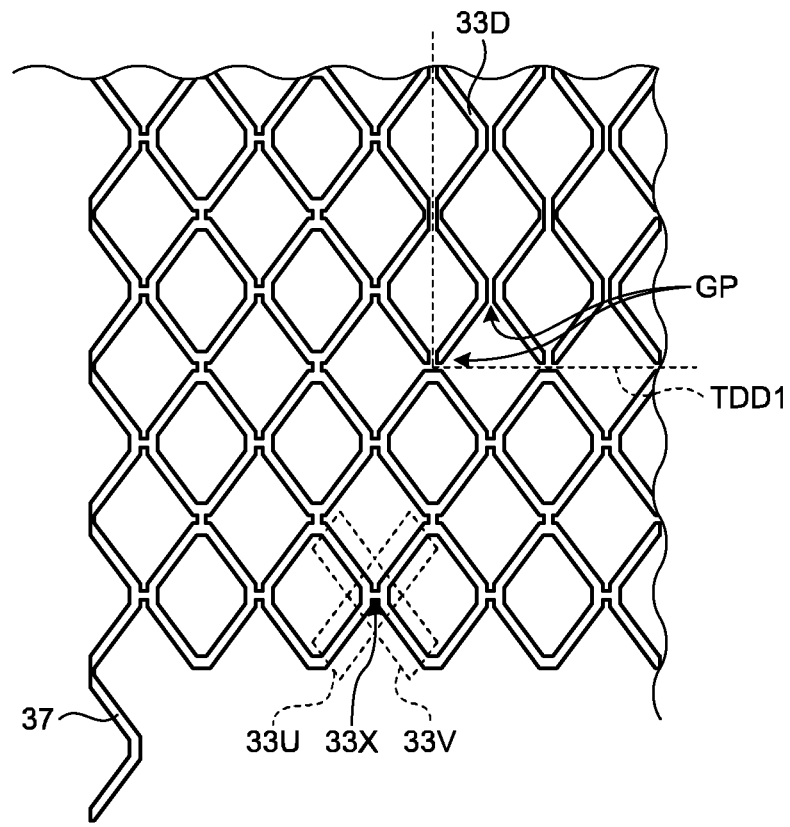
FIG. 36 is a partially enlarged view of the second electrode according to a first modification of the fourth embodiment.

FIG. 36 is a partially enlarged view of the second electrode according to a first modification of the fourth embodiment. The coupling wire 37 according to the first modification has a zigzag-line or wavy-line shape. The coupling wire 37 includes conductive thin wires having the same inclination as that of the first conductive thin wires 33U with respect to the direction parallel to the first direction Dx and conductive thin wires having the same inclination as that of the second conductive thin wires 33V with respect to the direction parallel to the first direction Dx. This structure prevents the coupling wire 37 from being visually recognized with respect to the first conductive thin wires 33U and the second conductive thin wires 33V.

In the configuration according to the first modification, the first conductive thin wires 33U and the second conductive thin wires 33V are coupled to each other to have a parallelogram shape. In the electric-field transmission region TDD1, the coupling portions 33X each have a slit GP provided without a conductive material to form the dummy electrodes 33D. The electric-field transmission regions TDD2, TDD3, TDD4, TDD5, and TDD6 also include the dummy electrodes having the same structure as that of the dummy electrodes 33D illustrated in FIG. 36.

Second Modification

Figure 37:
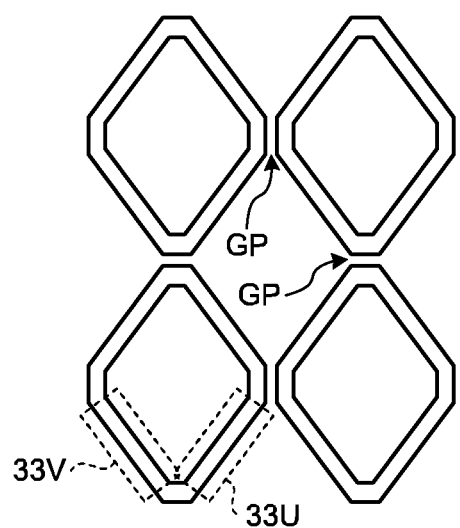
FIG. 37 is a partially enlarged view of the second electrode according to a second modification of the fourth embodiment.

FIG. 37 is a partially enlarged view of the second electrode according to a second modification of the fourth embodiment. In the configuration according to the second modification, two first conductive thin wires 33U and two second conductive thin wires 33V are coupled to each other to have a parallelogram shape. The conductive thin wires each having a parallelogram shape are arrayed in the electric-field transmission regions TDD1, TDD2, TDD3, TDD4, TDD5, and TDD6 (refer to FIG. 35).

Third Modification

Figure 38:
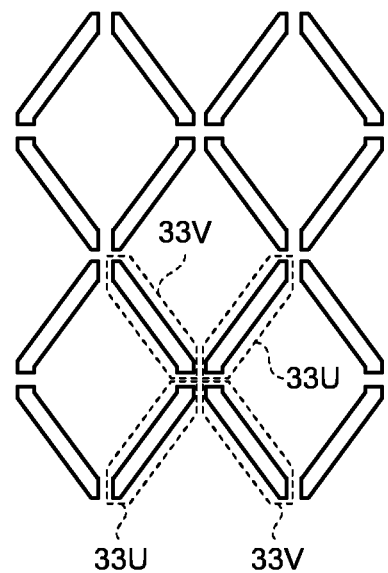
FIG. 38 is a partially enlarged view of the second electrode according to a third modification of the fourth embodiment.

FIG. 38 is a partially enlarged view of the second electrode according to a third modification of the fourth embodiment. In the configuration according to the third modification, the first conductive thin wire 33U and the second conductive thin wire 33V are separated from each other. The separated linear conductive thin wires are arrayed in the electric-field transmission regions TDD1, TDD2, TDD3, TDD4, TDD5, and TDD6 (refer to FIG. 35).

Fifth Embodiment

Figure 39:
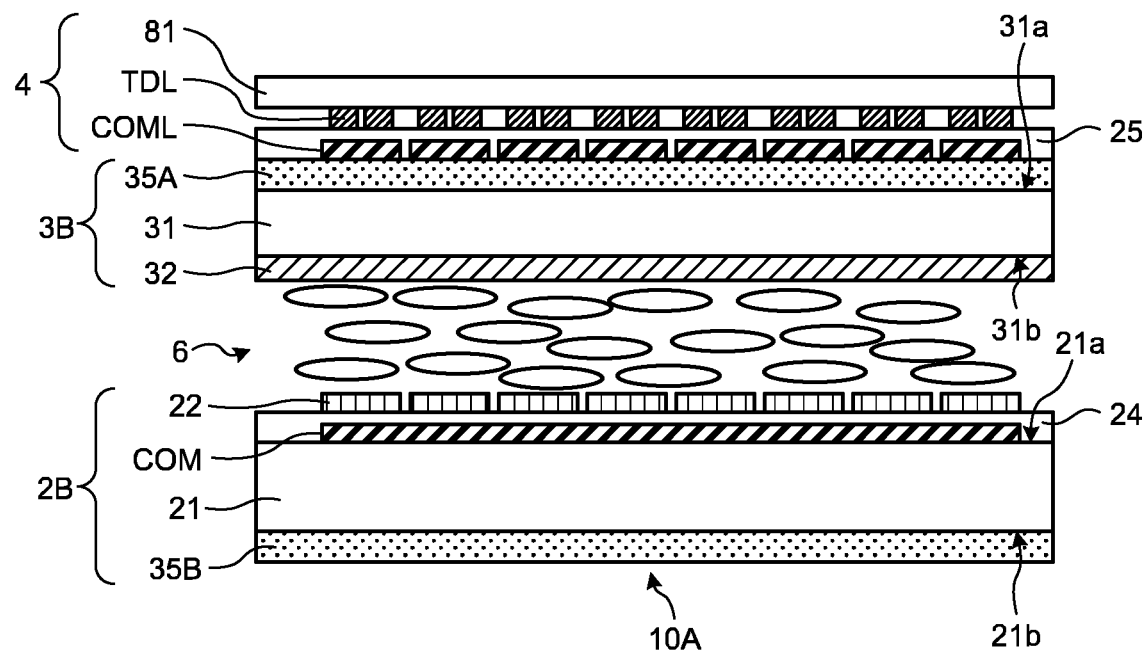
FIG. 39 is a sectional view illustrating an exemplary configuration of the detection device and the display device according to a fifth embodiment of the present disclosure.

FIG. 39 is a sectional view illustrating an exemplary configuration of the detection device and the display device according to a fifth embodiment of the present disclosure. Components described in the first to the fourth embodiments are denoted by like reference numerals, and explanation thereof is omitted. As illustrated in FIG. 39, a display panel 10A according to the fifth embodiment includes a pixel substrate 2B, a counter substrate 3B, the liquid crystal layer 6, and a detection device 4. The counter substrate 3B faces the pixel substrate 2B in a direction perpendicular to the surface of the pixel substrate 2B. The liquid crystal layer 6 is disposed between the pixel substrate 2B and the counter substrate 3B. The detection device 4 is disposed on the surface of the counter substrate 3B opposite to the surface facing the liquid crystal layer 6.

The pixel substrate 2B includes the first substrate 21, a common electrode COM, the insulating layer 24, the pixel electrodes 22, and the polarizing plate 35B. The common electrode COM is provided on the first surface 21a of the first substrate 21. The insulating layer 24 is provided on the first surface 21a to cover the common electrode COM. The pixel electrodes 22 are provided on the insulating layer 24. The polarizing plate 35B is provided on the second surface 21b of the first substrate 21. In the display periods Pd (refer to FIG. 25), the drive signals Vcomdc for display are supplied to the common electrode COM. The counter substrate 3B includes the second substrate 31, the polarizing plate 35A, and the color filter 32. The polarizing plate 35A is provided on a first surface 31a of the second substrate 31. The color filter 32 is provided on a second surface 31b of the second substrate 31.

The detection device 4 includes a plurality of first electrodes COML, an insulating layer 25, a plurality of second electrodes TDL, and a cover glass 81, for example. The first electrodes COML are provided on the polarizing plate 35A. The insulating layer 25 is provided on the polarizing plate 35A to cover the first electrodes COML. The second electrodes TDL are provided on the insulating layer 25. The cover glass 81 is provided on the insulating layer 25 to cover the second electrodes TDL. The detection device 4 also includes wires (not illustrated) coupled to the second electrodes TDL and wires (not illustrated) coupled to the first electrodes COML. With this configuration, the detection device 4 can desirably perform touch detection and hover detection similarly to the detection device in the sensor region according to the first embodiment.

While exemplary embodiments have been described, the embodiments are not intended to limit the present disclosure. The contents disclosed in the embodiments are given by way of example only, and various modifications may be made without departing from the spirit of the present disclosure. Appropriate modifications made without departing from the spirit of the present disclosure naturally fall within the technical scope of the disclosure.

The shapes, the positions, and the numbers of the first electrodes COML, the second electrodes TDL, the pixel electrodes 22, and other components are given by way of example only and may be appropriately modified.

The display device according to the present aspect may have the following aspects, for example.

(1) A detection device comprising:
  at least one substrate;
  a plurality of first electrodes extending in a first direction of the substrate and arrayed in a second direction intersecting the first direction; and
  a plurality of second electrodes arrayed in at least the first direction in a layer different from a layer of the first electrodes, wherein
  each of the second electrodes partially overlaps with the first electrodes in planar view and has an electric-field transmission region, in which an electric field can pass through each of the second electrodes in a direction perpendicular to the substrate, and
  the electric-field transmission region in each of the second electrodes overlaps with one of the first electrodes in planar view.
(2) The detection device according to (1), wherein
  each of the second electrodes includes a plurality of the electric-field transmission regions, and
  the electric-field transmission regions are disposed at positions not overlapping with one another in planar view.
(3) The detection device according to (1) or (2), wherein the electric-field transmission region is provided with a dummy electrode.
(4) The detection device according to (3), wherein
  the dummy electrode is made of a conductive material, and
  an electric potential of the dummy electrode is not fixed.
(5) The detection device according to any one of (1) to (4), wherein the electric-field transmission region has an outer shape, in which a length in the first direction is longer than a length in the second direction.
(6) The detection device according to any one of (1) to (5), wherein the first electrodes are strip electrodes extending linearly.
(7) The detection device according to any one of (1) to (5), wherein
  each of the second electrodes includes a plurality of the electric-field transmission regions, and
  the electric-field transmission regions are disposed in a row-column configuration.
(8) The detection device according to (7), wherein
  the first electrodes are partially bent,
  the first electrodes each have a wide portion that has a width in the second direction larger than a width of remaining portions, and
  the wide portion of one of the first electrodes and the wide portion of another one of the first electrodes adjacent to the one of the first electrodes are disposed side by side in the first direction.
(9) The detection device according to (7), wherein
  the first electrodes include a plurality of linear wires extending in the first direction and a plurality of electrode pieces electrically coupled to the linear wires,
  each of the electrode pieces is wider than each of the linear wires, and
  each of the electrode pieces overlaps with one of the electric-field transmission regions.
(10) The detection device according to any one of (1) to (9), further comprising:
  a drive circuit configured to supply a first drive signal to the first electrodes and supply a second drive signal to the second electrodes; and
  a control circuit having a first detection mode of detecting a target object in contact with a detection surface in accordance with a first detection signal corresponding to a change in mutual capacitance between the first electrodes and the second electrodes when the first drive signal is supplied to the first electrodes, and a second detection mode of detecting the target object in a non-contact state with respect to the detection surface in accordance with a second detection signal corresponding to a change in self-capacitance in the second electrodes when the second drive signal is supplied to the second electrodes.
(11) The detection device according to (10), further comprising a detection circuit, wherein
  the detection circuit identifies, in the first detection mode, one of the first electrodes supplied with the first drive signal and detects the target object in contact with the detection surface, in accordance with the first detection signal corresponding to a change in mutual capacitance between the one of the first electrodes and one of the second electrodes overlapping with the one of the first electrodes, in the electric-field transmission region of the one of the second electrodes.
(12) The detection device according to any one of (1) to (11), wherein the second electrodes each include a plurality of metal wires having a mesh, zigzag-line, or wavy-line shape.

(13) The detection device according to (10), wherein the drive circuit supplies a signal synchronized with the second drive signal and having an electric potential identical to an electric potential of the second drive signal to the first electrodes in the second detection mode.
(14) The detection device according to (1), wherein the second electrodes each have a substantially rectangular, square, polygonal, or elliptic shape.
(15) The detection device according to (1), wherein
each of the second electrodes includes a plurality of the electric-field transmission regions, and
the electric-field transmission regions in each of the second electrodes overlap with the respective first electrodes in planar view.
(16) A display device comprising:
a display panel including the detection device according to any one of (1) to (15) and a display region, wherein
the second electrodes are provided in a region overlapping with the display region.

What is claimed is:

1. A detection device comprising:
at least one substrate;
a plurality of first electrodes extending in a first direction of the substrate and arrayed in a second direction intersecting the first direction; and
a plurality of second electrodes arrayed in at least the first direction in a layer different from a layer of the first electrodes, wherein
each of the second electrodes partially overlaps with the first electrodes in planar view and has an electric-field transmission region, in which an electric field can pass through each of the second electrodes in a direction perpendicular to the substrate,
the electric-field transmission region in each of the second electrodes overlaps with one of the first electrodes in planar view,
each of the second electrodes includes a plurality of the electric-field transmission regions,
the electric-field transmission regions are disposed in a row-column configuration,
the first electrodes are partially bent,
the first electrodes each have a wide portion that has a width in the second direction larger than a width of remaining portions, and
the wide portion of one of the first electrodes and the wide portion of another one of the first electrodes adjacent to the one of the first electrodes are disposed side by side in the first direction.

2. The detection device according to claim 1, further comprising:
a drive circuit configured to supply a first drive signal to the first electrodes and supply a second drive signal to the second electrodes; and
a control circuit having a first detection mode of detecting a target object in contact with a detection surface in accordance with a first detection signal corresponding to a change in mutual capacitance between the first electrodes and the second electrodes when the first drive signal is supplied to the first electrodes, and a second detection mode of detecting the target object in a non-contact state with respect to the detection surface in accordance with a second detection signal corresponding to a change in self-capacitance in the second electrodes when the second drive signal is supplied to the second electrodes.

3. The detection device according to claim 2, further comprising a detection circuit, wherein the detection circuit identifies, in the first detection mode, one of the first electrodes supplied with the first drive signal and detects the target object in contact with the detection surface, in accordance with the first detection signal corresponding to a change in mutual capacitance between the one of the first electrodes and one of the second electrodes overlapping with the one of the first electrodes, in the electric-field transmission region of the one of the second electrodes.

4. The detection device according to claim 1, wherein the second electrodes each include a plurality of metal wires having a mesh, zigzag-line, or wavy-line shape.

5. A detection device comprising:
at least one substrate;
a plurality of first electrodes extending in a first direction of the substrate and arrayed in a second direction intersecting the first direction; and
a plurality of second electrodes arrayed in at least the first direction in a layer different from a layer of the first electrodes, wherein
each of the second electrodes partially overlaps with the first electrodes in planar view and has an electric-field transmission region, in which an electric field can pass through each of the second electrodes in a direction perpendicular to the substrate,
the electric-field transmission region in each of the second electrodes overlaps with one of the first electrodes in planar view,
each of the second electrodes includes a plurality of the electric-field transmission regions,
the electric-field transmission regions are disposed in a row-column configuration,
the first electrodes include a plurality of linear wires extending in the first direction and a plurality of electrode pieces electrically coupled to the linear wires,
each of the electrode pieces is wider than each of the linear wires, and
each of the electrode pieces overlaps with one of the electric-field transmission regions.

6. A detection device comprising:
at least one substrate;
a plurality of first electrodes extending in a first direction of the substrate and arrayed in a second direction intersecting the first direction;
a plurality of second electrodes arrayed in at least the first direction in a layer different from a layer of the first electrodes;
wherein each of the second electrodes partially overlaps with the first electrodes in planar view and has an electric-field transmission region, in which an electric field can pass through each of the second electrodes in a direction perpendicular to the substrate, and
wherein the electric-field transmission region in each of the second electrodes overlaps with one of the first electrodes in planar view;
a drive circuit configured to supply a first drive signal to the first electrodes and supply a second drive signal to the second electrodes; and
a control circuit having a first detection mode of detecting a target object in contact with a detection surface in accordance with a first detection signal corresponding to a change in mutual capacitance between the first electrodes and the second electrodes when the first drive signal is supplied to the first electrodes, and a second detection mode of detecting the target object in a non-contact state with respect to the detection surface in accordance with a second detection signal corresponding to a change in self-capacitance in the second electrodes when the second drive signal is supplied to the second electrodes, wherein the drive circuit supplies a signal synchronized with the second drive signal and having an electric potential identical to an electric potential of the second drive signal to the first electrodes in the second detection mode.

7. The detection device according to claim 6, wherein the second electrodes each have a substantially rectangular, square, polygonal, or elliptic shape.

* * * * *